United States Patent [19]

Scalise et al.

[11] Patent Number: 5,475,703
[45] Date of Patent: Dec. 12, 1995

[54] RADIO FREQUENCY-EXCITED GAS LASER

[76] Inventors: Stanley J. Scalise, 1620 16th Ter., Palm Beach Gardens, Fla. 33418-3661; Dennis W. Davis, 10740 Eland St., Boca Raton, Fla. 33428

[21] Appl. No.: 321,224

[22] Filed: Oct. 11, 1994

Related U.S. Application Data

[63] Continuation-in-part of Ser. No. 236,385, Apr. 29, 1994, abandoned.

[51] Int. Cl.⁶ .................................................. H01S 3/097
[52] U.S. Cl. .................. 372/82; 372/87; 372/92
[58] Field of Search ................... 372/82, 87, 61, 372/92, 55, 83

[56] References Cited

U.S. PATENT DOCUMENTS

| | | | |
|---|---|---|---|
| 4,719,639 | 1/1988 | Tulip | 372/82 |
| 5,029,173 | 7/1991 | Seguin | 372/87 |
| 5,062,116 | 10/1991 | Christensen | 372/61 |
| 5,237,580 | 8/1993 | Mefferd | 372/87 |
| 5,305,346 | 4/1994 | Ault | 372/82 |

*Primary Examiner*—Leon Scott, Jr.

[57] ABSTRACT

A radio frequency (RF)-excited waveguide laser of improved efficiency is disclosed. Features which contribute to efficiency include a constriction in the RF cavity cross section which effects an intense, uniform electric field in the gas discharge region, discontinuities in the electrode surfaces bounding the discharge gap region which defeat longitudinal resonances in the RF cavity and thereby provide longitudinal uniformity in the gap region electric field, and dielectric tube(s) for confining gas in the discharge gap region. Additional versions of the invention include open-loop and closed-loop frequency tuning of the laser RF cavity and modular RF cavities which can be connected to achieve higher optical output power.

40 Claims, 18 Drawing Sheets

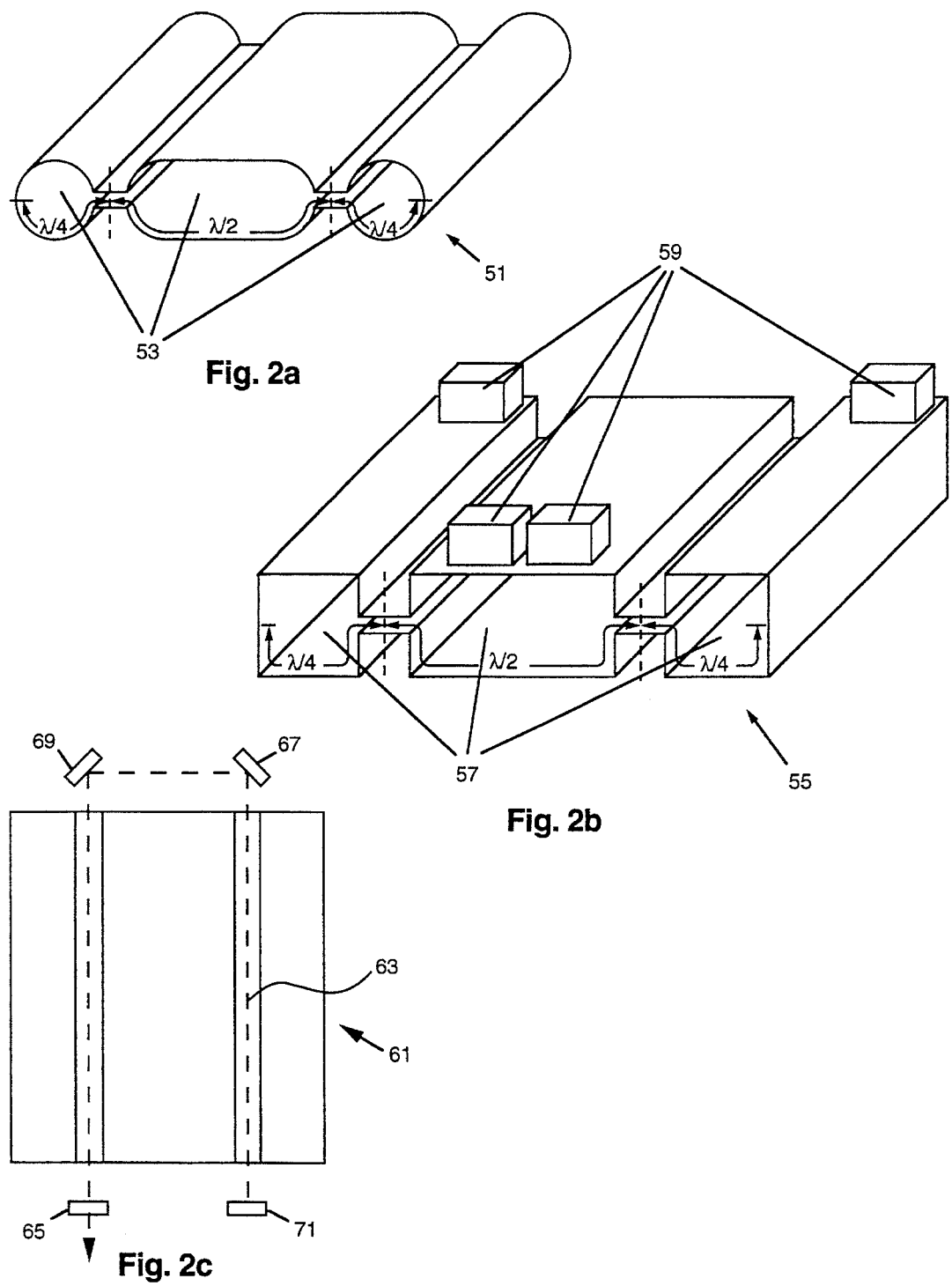

RADIO FREQUENCY-EXCITED GAS LASER

This is a continuation in part of U.S. patent application Ser. No. 236,385, filed Apr. 29, 1994, now abandoned.

BACKGROUND-FIELD OF THE INVENTION

This invention relates to radio frequency (RF)-excited gas lasers and more particularly to means for controlled, efficient, uniform excitation of the gas in such lasers. The invention also concerns modular laser construction offering scalability of laser output power.

BACKGROUND-DESCRIPTION OF THE PRIOR ART

In order to build an efficient, electrically excited gas laser, it is essential that a stable, longitudinally uniform electric discharge be generated within a controlled lasing gas volume. Various techniques have been applied to electrically excite gas mixtures. These basically breakdown into two main categories; 1) Direct Current and 2) Alternating Current. Alternating current discharges include RF excitation, which is the subject of this patent. In fact, many RF-excited gas lasers are being marketed throughout the world. Most, but not all, fall into category of optical waveguide configurations where the RF field is applied (transverse to the optical lasing axis) via electrodes.

Prior art teaches RF cavity cross sections having an electrode gap region, but such cavities are not operated in transverse resonance, being driven at frequencies far below the transverse resonance. Often these electrodes are an integral part of the optical waveguide structure, or attached immediately adjacent to it.

RF-excited lasers of the optical waveguide or slab geometries do not confine the discharge volume by means other than the RF cavity walls. Indeed, although a plasma discharge is initiated in the region between electrode surfaces it can under appropriate circumstances extend to portions of the RF cavity volume outside the useful optical path. This reduces the efficiency of the laser by depositing energy in volumes which do not contribute to laser gain. Undesirable spreading of the plasma discharge becomes more problematic as RF power density is increased for the purpose of obtaining larger laser power output. Thus, confinement of the excited laser gas volume to that of the desired laser cavity mode is essential for high efficiency operation.

When the length of the optical waveguide structure becomes a significant portion of the RF excitation wavelength, voltage variations along the length of the optical waveguide begin to occur at points of current maxima on the surfaces bounding the discharge. These voltage variations produce corresponding longitudinal perturbations in the RF power deposited in the excited gas. The result is uneven pumping of the gas along the length of the laser, undesirably affecting efficiency and overall operation.

For a number of complex reasons, it is often advantageous in these transversely excited laser geometries to increase the frequency of the RF excitation into the microwave region. However, this exacerbates the previously mentioned longitudinal variations in the RF electric field. Most lasers of usable gain length would have dimensions many times the wavelength of RF excitation. This is particularly true if microwave frequencies are employed, the wavelength being on the order of only a few centimeters. Many voltage nodes would occur along the laser's length resulting in multiple, non-energized portions of the desired discharge volume.

A number of patents endeavor to overcome this problem by coupling microwave radiation into the discharge region in a direction transverse to the discharge longitudinal axis. U.S. Pat. No. 5,050,181 to Gekat teaches the use of an over-coupling structure used with a waveguide to introduce microwave energy into the discharge region. This structure is external to the actual discharge and associated optical waveguide structures and is in contrast to the simplicity and compactness of the present disclosure. U.S. Pat. No. 5,224,117 to Kroger, et al. involves coupling microwave radiation through a multiplicity of apertures running the length of a slab laser from a large waveguide oriented perpendicular to the optical axis of the laser. The length over which this is possible remains limited to the width of the injecting waveguide horn and the associated waveguide established at the lowest order mode frequency. Here, again, compactness is sacrificed in an effort to gain uniform excitation of the gas. U.S. Pat. No. 4,987,577 to Seunik discloses a microwave-driven ridge waveguide laser which is driven by microwave radiation at a frequency below the waveguide cutoff. The patent to Seunik allows a breakdown of the gas contained in all regions of the waveguide, not just in a constricted region. Additionally, tapered dielectric inserts are included in the waveguide in order to improve longitudinal uniformity of the discharge. These inserts must be optically smooth and constitute an expensive means for achieving such field uniformity. The patent to Seunik also discloses a folded optical cavity enclosing multiple layers of waveguides. This allows increased power output, but at the cost of increased structural complexity. U.S. Pat. No. 5,043,995 to Lackner discloses a microwave excited axial gas flow laser. All of these prior art methods cited suffer from the inability to make use of microwave sources of differing wavelengths because the coupling structures employed are frequency selective.

Tunability of RF-excited lasers is desirable in order to accommodate different RF power sources of differing frequency. U.S. Pat. No. 4,837,772 to Laakmann discloses a device which is an RF-excited gas laser in which the discharge section of the laser resonates at a desired radio frequency as a result of incorporating the discharge section in the feedback loop of a power oscillator circuit. The oscillator circuit can thereby automatically adjust to changes in parameters of the lasing gas medium as the gas is operated in conditions prior to breakdown, at threshold, and at various power levels. The tunability of such an oscillator which includes the discharge gas impedance in the oscillator circuit is limited, however, and significantly different oscillator circuit designs would be required when using different RF power sources. The presently disclosed invention elaborates on the concepts described in U.S. Patent and Trademark Office Document Disclosure Number 336594. A preferred embodiment of the present invention include a unique microwave, RF-excited laser of compact, modular construction which does not exhibit the deleterious effects of uneven longitudinal pumping. It offers the ability to have a uniformly excited RF discharge of arbitrary length and the ability to tune the laser to accommodate RF power sources of differing frequency. It also provides the ability to compensate for any deleterious effects brought about by thermally induced changes in the cavity dimensions controlling the transverse resonance frequency. Furthermore, the concept is also easily scalable to higher and higher laser powers through the use of multiple, optically linked, RF cavities.

SUMMARY OF THE INVENTION

The main object of the present invention is to provide an RF-excited laser of high efficiency that is easily scalable in power through modular design. Secondary goals achieved by the present invention include low manufacturing cost, compatibility with low cost RF power sources such as microwave magnetrons, and ease of RF tunability. The transverse uniformity of discharge is provided by an RF cavity design which has at least one constricted region. Such a constricted region is for the purpose of supporting a transverse waveguide mode which concentrates the electric field in the region of the constriction. An exemplary cavity geometry is that having a cross section with an "H" shape, foreshortened in height. The constricted region is in the lateral center of the waveguide where the electric field is then concentrated. Longitudinal variation in the discharge region electric field is defeated by destroying potential longitudinal resonance. This is done using longitudinally spaced discontinuities formed in the ridge surfaces bounding the constricted region. The use of dielectric tubes to contain the discharge gas in the constricted region allows the RF cavity to be formed by low cost manufacturing means such as metal stamping. Furthermore, in some embodiments, the RF cavity need not be a gas tight containment and therefore it can be more easily mechanically deformed in order to tune the transverse RF resonance of the cavity. This is advantageous in closed-loop control of transverse cavity resonance for constant laser output power, or in instances which require use of differing RF power sources. Modular design of the RF cavities with their own RF power sources offers the ability to configure multiple such cavities in tandem within an optical resonator to achieve increased optical output power.

Included in the invention description which follows are methods to:

1. laterally concentrate the RF excitation field
2. contain the discharge within a desired region,
3. provide a means of easily tuning the resonant frequency of the high-Q cavity defined by the cross sectional shape of its interior,
4. substantially reduce deleterious effects of electric field variations down the length of the constricted region in the direction perpendicular to the surface formed by the restricted cavity cross-section (i.e. along the optical axis of the laser),
5. provide a means of isolating multiple RF cavity modules from mutual interaction at the RF drive frequency, and
6. provide a means of segmenting the laser into easily mated RF cavity enclosures which can be separately driven, but assembled together serially to form a laser of a desired output power level.

The following definitions will guide the disclosure of the present invention: Gain region refers to a volume containing excited matter capable of stimulated emission.

RF-excited laser is a laser having a gain region created by the deposition of RF energy in an atomic or molecular species.

Constricted region refers to a narrowing in the cross section of the RF cavity.

Expanded region refers to that portion of the RF cavity cross section other than the constricted region.

Optical waveguide laser refers to conventional lasers in which the discharge volume also comprises an optical waveguide.

OBJECTS AND ADVANTAGES

Several objects and advantages of the present invention are:

(a) to provide an RF-excited laser which has improved electric field uniformity over the length of the discharge region;

(b) to provide an RF-excited laser which has spatially uniform discharge region of arbitrary length;

(c) to provide an RF-excited laser which has improved containment of gaseous discharge;

(d) to provide an RF-excited laser which has improved transverse resonant frequency tuning;

(e) to provide a modular RF-excited laser which offers scalability of power;

(f) to provide an RF-excited laser which accommodates different sources of RF power;

(g) to provide an RF-excited laser having closed-loop control of RF cavity transverse resonance for purposes of maintaining constant laser power output;

(h) to provide a modular RF-excited laser having low manufacturing cost.

DRAWING FIGURES

In the drawings, closely related figures have the same number but different alphabetic suffixes.

FIG. 2a is a pictorial diagram of an RF cavity depicting a cross section having multiple constricted regions connecting multiple circularly-shaped expanded regions.

FIG. 2b is a pictorial diagram of an RF cavity depicting a cross section having multiple constricted regions connecting multiple rectangularly-shaped expanded regions.

FIG. 2c is a schematic top view of an RF cavity as in FIG. 2a or 2b depicting an associated folded optical axis.

FIG. 10b is side view cross-sectional diagram of the laser resonator of FIG. 10a.

FIG. 12b is an exploded pictorial diagram showing the addition of end closures to the RF cavity of FIG. 12a.

DETAILED DESCRIPTION OF THE INVENTION

Defining the Discharge Region

Figure 1A:
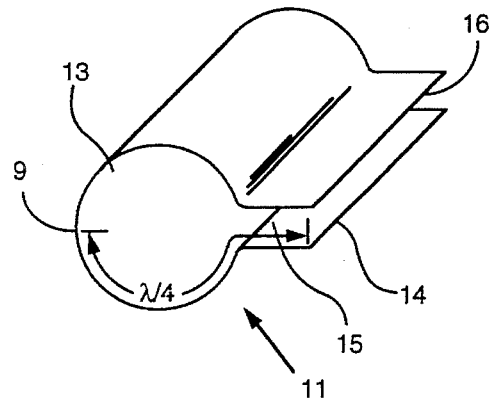
FIG. 1a is a pictorial diagram of an RF cavity depicting a cross section having a single constricted region and a single expanded region.
Figure 1B:
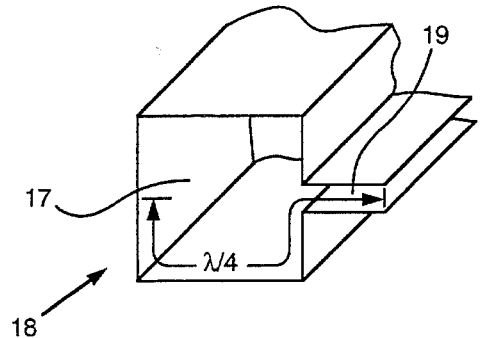
FIG. 1b is a pictorial diagram of an RF cavity depicting an alternative cross section having a single constricted region and a single expanded region.
Figure 1C:
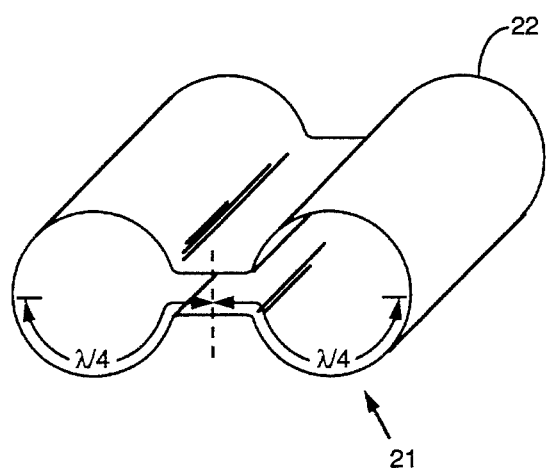
FIG. 1c is a pictorial diagram of an RF cavity depicting a cross section having a single constricted region connecting two circularly-shaped expanded regions.
Figure 1D:
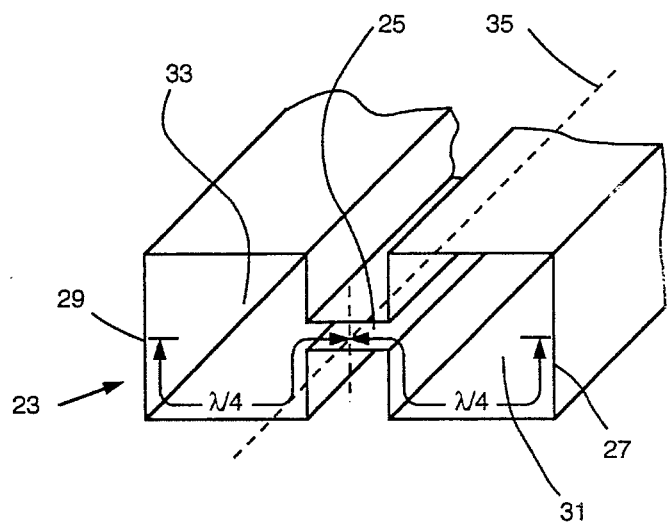
FIG. 1d is a pictorial diagram of an RF cavity depicting an alternative cross section having a single constricted region connecting two rectangularly-shaped expanded regions.

For the purpose of concentrating the RF excitation electric field, the cavity cross section includes one or more constrictions. When operated at transverse resonance, the modal structure of the excitation field will indeed exhibit high field values within the constriction(s). A wide range of cavity cross sectional geometries are possible which include a constricted region(s) for establishment of the desired transverse waveguide mode. FIG. 1 provides a few examples of such geometries. FIG. 1a depicts a longitudinal section of an impedance-transforming RF cavity 11 with a cross section which has a circular expanded region 13 and a linear constricted region 15. Edge 9 of RF cavity 11 is at a lateral position of low impedance which is separated transversely by a quarter of the RF excitation wavelength from a lateral position of infinite impedance represented by edges 14 and 16 of RF cavity 11. A cavity section 18 having a rectangular expanded region 17 and rectangular constricted region 19 is shown in FIG. 1b. FIGS. 1c and 1d depict cavity cross sections having two expanded regions connected by a single constricted region. In FIG. 1c, RF cavity 21 makes use of circular expanded regions 22. As indicated in FIGS. 1a through 1d, the lateral center of the constricted region should be located laterally approximately a quarter of the RF excitation wavelength from the farthest edge of the adjacent, expanded region.

For a discussion of the details of the RF excitation of the cavity, attention is directed to FIG. 1d showing an easily extruded cross section in the form of a "H". The optical axis 35 of the associated laser is depicted running perpendicular to the plane of the "H"-shaped RF cavity cross section 23 (i.e., in and out of the plane surface formed by the "H").The purpose of the constricted region 25 in the "H"-shaped cross section is, as previously stated, to concentrate the transverse electric field lines so as to efficiently excite the gas molecules residing within the constricted region 25. Since in the transverse dimensions, the "H"-shaped region acts as a resonant cavity for its lowest order transverse mode, the electric field is zero at the extreme left and right walls, 27 and 29, respectively, and builds up to a peak at the center of the constricted region 25, much as for the case of the lowest transverse mode for conventional microwave waveguides. Another way to look at what is happening is to treat the wall of the cavity as forming a capacitively loaded quarter wave line which is shorted at the wall 27 and open at the center of the constricted region 25. The significantly smaller vertical dimension in the constricted region 25, however, drastically increases the electric field strength over what it would normally be if the interior region of the cavity were in the form of a rectangle and not in the form of an "H". Thus, when RF energy is applied to the cavity at its lowest transverse mode frequency, a discharge is initiated and supported in the constricted region only. The maximum electric field strength in regions 31 and 33 immediately to the right and left of the constricted region 1 is normally insufficient to establish a plasma, although the gas pressure in the adjacent regions 31 and 33 would be the same as in constricted region 25. The constricted region 25 can be wide compared to its vertical height, but must be narrow compared to the overall dimensions of the RF cavity cross section 23.

The constricted region does not necessarily form an optical waveguide. However, it could form such a waveguide if demanded by the specific parameters of the laser design. The interior of the microwave RF cavity can form a gas tight enclosure with laser mirror mounts near the longitudinal ends. Again, the specific shape of the cavity need not be restricted to an "H".

Figure 3:
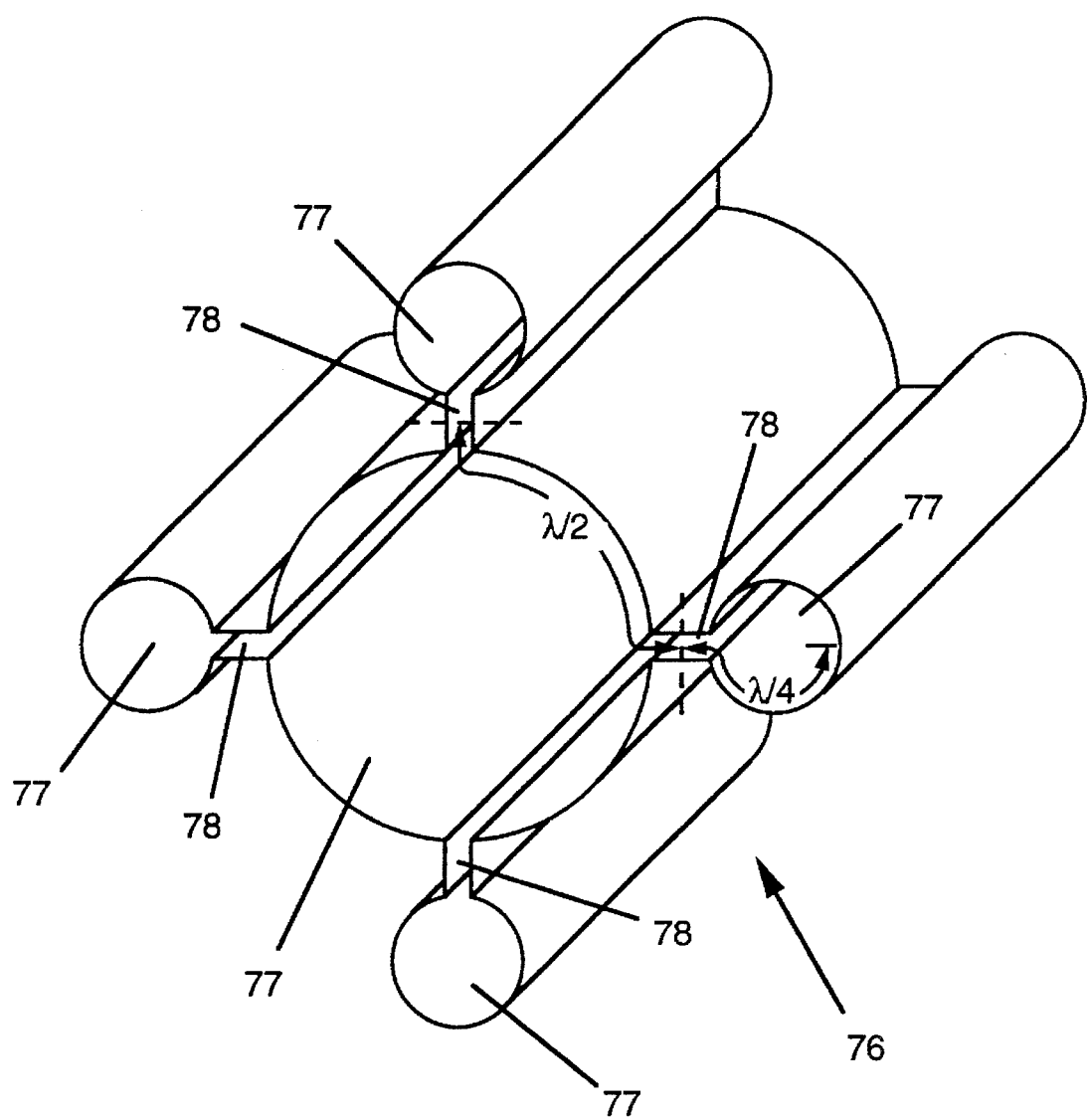
FIG. 3 is a pictorial diagram of an RF cavity depicting a cross section having multiple constricted regions connecting multiple expanded regions in both lateral and vertical directions.

FIGS. 2a and 2b depict cross sectional cavity geometries having more than one constricted region adjoining a multiplicity of suitably shaped and sized expanded regions. FIG. 2a shows a cavity 51 having rounded expanded regions 53. FIG. 2b shows a cavity 55 of rectangular expanded regions 57 having separate RF excitation power sources 59 used to couple power through each such expanded region. The positions at which energy is coupled into the RF cavity will be dictated by the type of coupling and the locations of appropriate impedance in the RF cavity. Again, the power coupled into the RF cavity will be dissipated in the constricted regions owing to the resonant transverse mode structure. FIG. 2c is a top view of an RF cavity 61 of either FIG. 2a or 2b showing the use of these RF cavity geometries in a folded optical cavity. The optical axis 63 is established by totally reflecting mirrors 67, 69, and 71 and partially reflective output mirror 65. RF cavity end closures supporting the mirrors, not shown in this figure for reasons of clarity, will be shown in a following figure. An RF cavity 76 having multiple expanded cavity regions 77 joined in a cross or radial configuration is depicted in FIG. 3. Note is to be made of the relative interior surface distances required to maintain high impedance in the constricted regions 78.

Confinement of the Discharge Gas

If the power applied to an RF-excited laser would be further increased significantly beyond the typical low pressure regime (as would be the case in compact, high power versions of the presently disclosed laser concept), the plasma within the desired discharge region would eventually spread into the adjacent cavity regions resulting in RF power deposition outside the useful lasing gas volume. This process would be initiated due to field fringing effects at the extreme edges of the desired discharge region itself and would ultimately result in an unwanted decrease in overall operational efficiency.

Figure 4A:
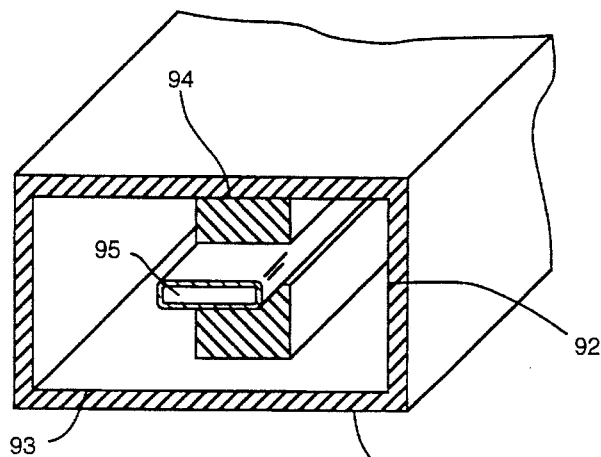
FIG. 4a is a pictorial diagram of an RF cavity containing a single gas enclosure.
Figure 4B:
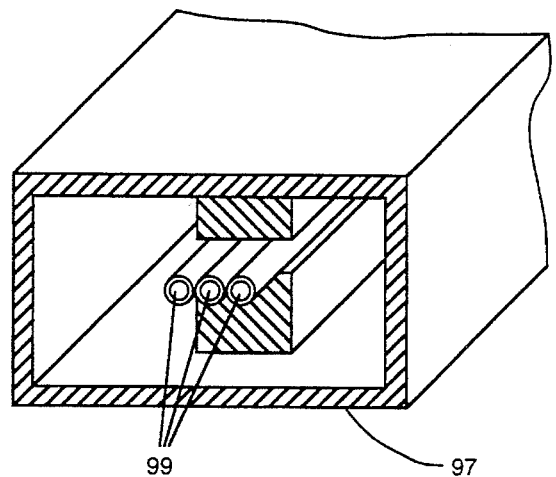
FIG. 4b is a pictorial diagram of an RF cavity containing multiple gas enclosures.

However, if one were to now isolate the desired discharge region from the balance of the RF cavity interior via a low loss, RF or microwave dielectric containment vessel having integral laser windows such as the tube or tubes shown in FIGS. 4a and 4b, the lower pressure required for many gas laser mixtures could be confined to the interior of the tube(s). The adjacent regions could be maintained at a substantially higher (>10 times) gas pressure, further discriminating against any unwanted plasma discharge initiation. The detailed shape of the dielectric containment vessel can take various forms. FIG. 4a shows an RF cavity 91 which includes a rectangular tube 93 for containing the discharge gas 95. FIG. 4b depicts an RF cavity 97 containing a plurality of tubes 99. Other positive reasons for isolating the laser gas within a tube(s) could include the need to prevent contamination of the gas (for certain gas mixtures) by the metallic walls of the cavity interior or to prevent chemical reaction with the RF cavity walls when using highly corrosive/reactive gas mixtures. Reactive gas mixtures might be required to get laser action at specific operating wavelengths of interest (e.g. hydrogen fluoride operating in the near infrared). Isolation of the constricted region also simplifies the overall design of the laser from the standpoint of not needing to pressure seal the overall RF cavity from gaseous communication with its exterior. This can lead to easier fabrication, assembly, and maintenance; potentially lowering the acquisition and operating costs of the laser.

Figure 4C:
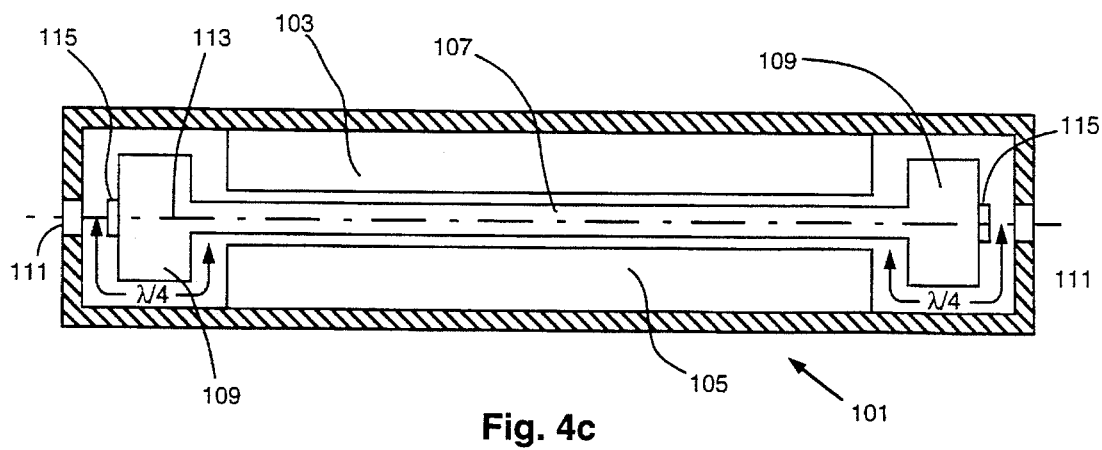
FIG. 4c is a cross sectional view of an RF cavity with a gas enclosure having a gas ballast regions.

The constricted RF waveguide gas laser described above as well as conventional slab, and optical waveguide lasers can all benefit from the confinement of the gas in a dielectric containment vessel having integral laser windows such as the tube or tubes shown in FIG. 4. With the use of such containments, the RF cavity need not be gas tight, thereby reducing associated gas sealing considerations. The dielectric material can be in the form of a tube(s) (of various possible cross-sectional geometries) placed within the RF cavity. The dielectric tube(s) would be made gas tight and the remaining portion of the RF laser cavity filled with air or an insulating fluid. In the case of a slab geometry, various sealed gas mixtures having various pressures can be introduced into the laser in modular fashion. If necessary, gaseous communication between tubes or to an external ballast reservoir can be accomplished as shown in FIG. 4c. RF cavity 101 contains a gas confinement tube 107 placed between upper and lower surfaces 103 and 105, respectively, bounding the constricted region. Surfaces 103 and 105 can be considered electrode surfaces. In general, shorting of the ends of electrode surfaces 103 and 105 is avoided by placing the longitudinal ends of the RF cavity at a location such that the distance along the interior cavity surface from a longitudinal end of the RF cavity to the commencement of the confined region is a quarter wavelength as shown in the figure. Unexcited gas is contained in the ballast regions 109 of the tube by virtue of being located outside of high field regions. Optical windows or mirrors 115 are sealed to the ends of tube 107 in order to create an optical cavity having an optical axis 113. Optical coupling apertures 111 are provided in the ends of the RF cavity 101 for transmission of light.

Again, it is important to note that the dielectric containment vessel(s) does not necessarily form an optical waveguide at the laser wavelength. The laser can however be designed so that the gas confinement tube does indeed form the optical waveguide.

Defeating the Longitudinal Variations of the Cavity Electric Field Distribution

Figure 5A:
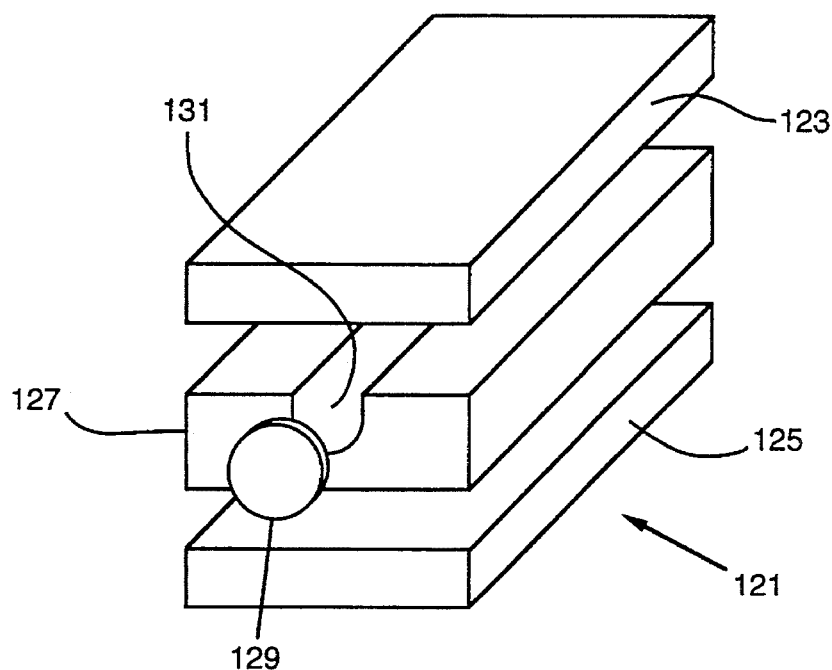
FIG. 5a is an exploded diagram of a conventional optical waveguide RF-excited laser.
Figure 5B:
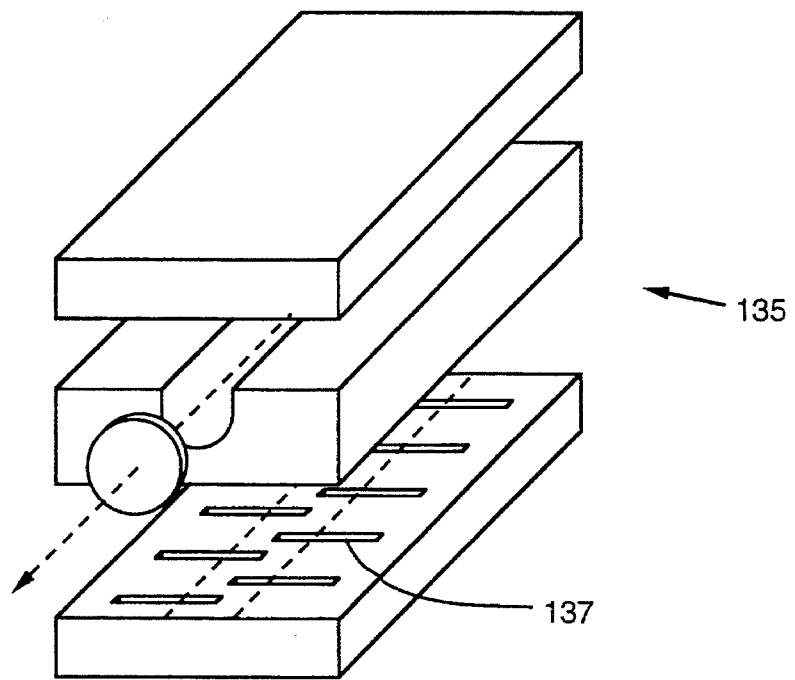
FIG. 5b is an exploded diagram of an optical waveguide RF-excited laser having longitudinally-discontinuous electrode surfaces.

A longitudinal mode will be established down the length of the cavity in an RF-excited laser of sufficient length. FIG. 5a shows an exploded view of a conventional optical waveguide laser 121 after U.S. Pat. No. 4,577,323 to Newman et al. A dielectric slab 127 contains a machined channel 131 which serves as an optical waveguide. The slab 127 is sandwiched between an upper and lower electrode 123 and 125, respectively. One of the laser resonator mirrors 129 is also shown. Minimum and maximum electric field values will be established along the length of the laser discharge due to the situation that, either such a laser is constructed having a length much larger than the typical very high frequency (VHF) excitation wavelength, or for nominal laser gain lengths, the overall length of the laser cavity will normally be on the order of many wavelengths for the case of microwave excitation. There will also be a related variation of the current distribution on the electrode surfaces along the laser optical axis. An approach to prevention of these variations is shown in the laser 135 of FIG. 5b. Destruction of the longitudinal resonance of the RF cavity at its lowest order transverse drive frequency has been achieved by cutting transverse slots 137 in the electrodes 123 and 125 either totally or partially across the discharge region at the longitudinal locations of high current in the electrodes as shown in FIG. 5b.

Figure 6A:
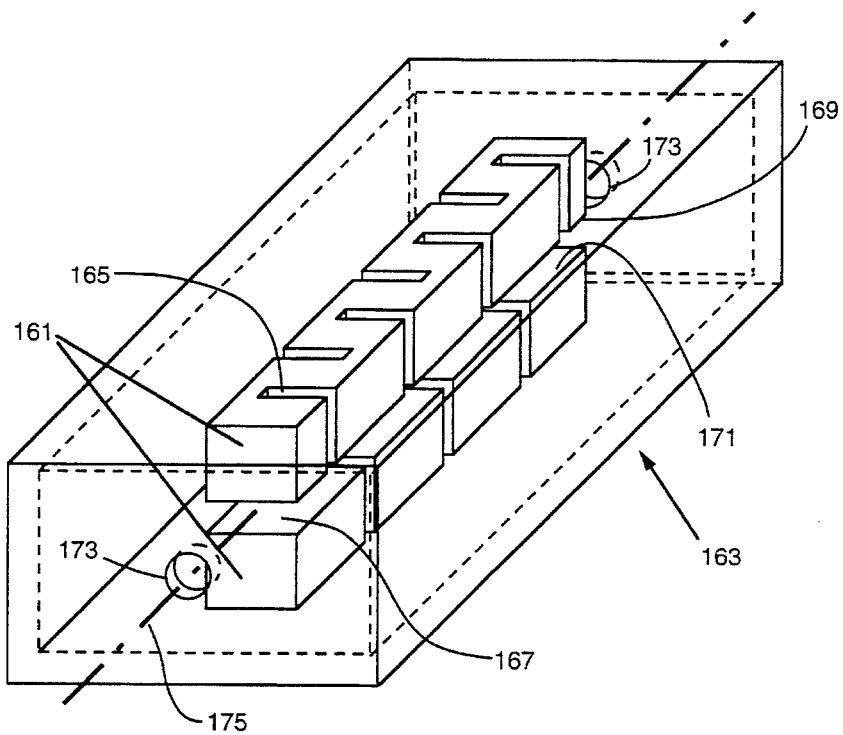
FIG. 6a is a pictorial diagram of an RF cavity having a constricted region and longitudinally-discontinuous electrode surfaces.
Figure 6B:
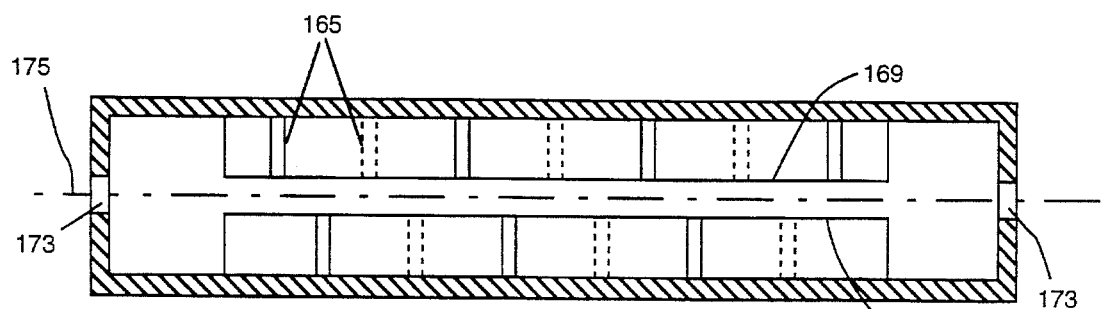
FIG. 6b is a side view of the RF cavity of FIG. 6a shown in section.
Figure 6C:
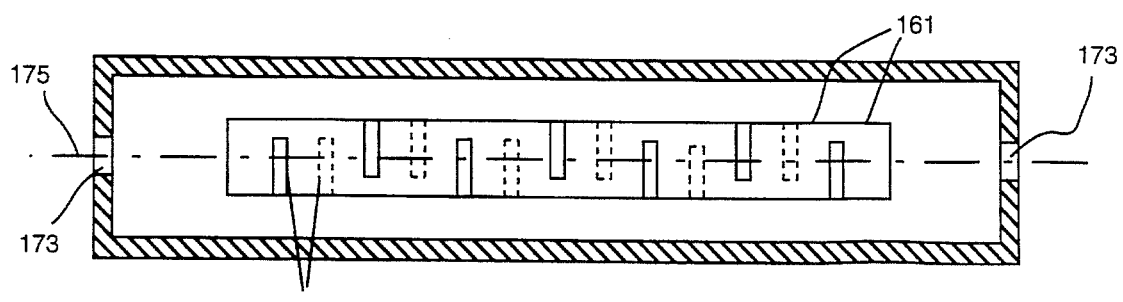
FIG. 6c is a top view of the RF cavity of FIG. 6a shown in section.

Greater detail regarding the slot geometry is addressed with reference to FIG. 6 showing a cavity geometry having a constricted cross section with optical axis 175. FIG. 6a depicts an RF cavity 163 showing longitudinal electrode structure 161 having transverse slots 165 cut across the electrodes. The transverse slots 165 in the constricted region 167 are shown surfaces 169 and 171 bounding the constricted region. The slots 165 are spaced periodically along the length of the laser discharge region at a distance corresponding to fractional wavelength intervals (typically 80 /2) of the transverse cavity drive wavelength. Note, however, that the slots 165 are not cut all the way across the constricted region surfaces 169 and 171. By leaving an interconnecting portion of the electrode surface in this way, it will be possible for the plasma to initially form in a small meandering region of the discharge constricted region and to expand fully throughout the full constriction volume as the RF drive power is increased to its full operational value. These cuts effectively attenuate the longitudinal resonance resulting from the previously uninterrupted length of the constricted region 167. This is tantamount to lowering the quality factor or "Q" of any longitudinal cavity resonances corresponding to the excitation frequency. This provides a vastly improved electric field distribution within the constricted region in the longitudinal direction along the length of the laser axis. Although the slots 165 serve to reduce longitudinal field variation associated with longitudinal cavity resonance, the spatially discrete nature of the slots 165 tends to cause some local longitudinal variation in the electric field. In order to ameliorate such local variation, the top and bottom set of slots are shown translated longitudinally with respect to each other. Optical apertures 173 are shown in the cavity ends. FIG. 6*b* shows the RF cavity 163 in cross section, from a side view with the cross section cut longitudinally by a vertical plane through the laser. The relative longitudinal displacement of slots 165 cut in the upper and lower constricted region surfaces 169 and 171 is clearly defined. FIG. 6*c* shows the RF cavity 163 from a top view through the cavity.

Figure 7A:
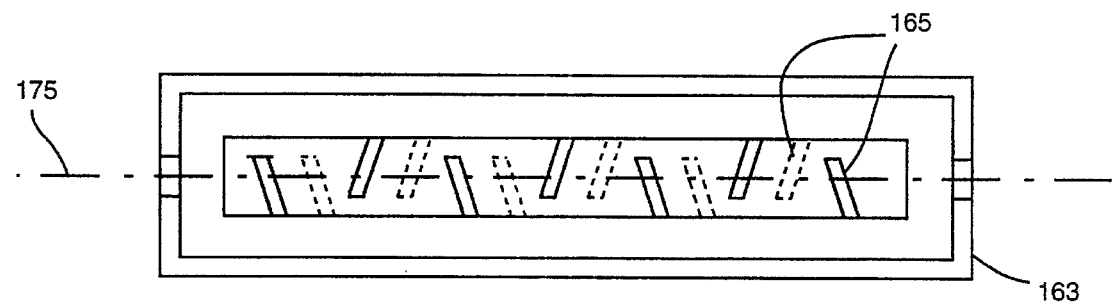
FIG. 7a is a top view diagram of the RF cavity showing a slanted slot geometry.
Figure 7B:
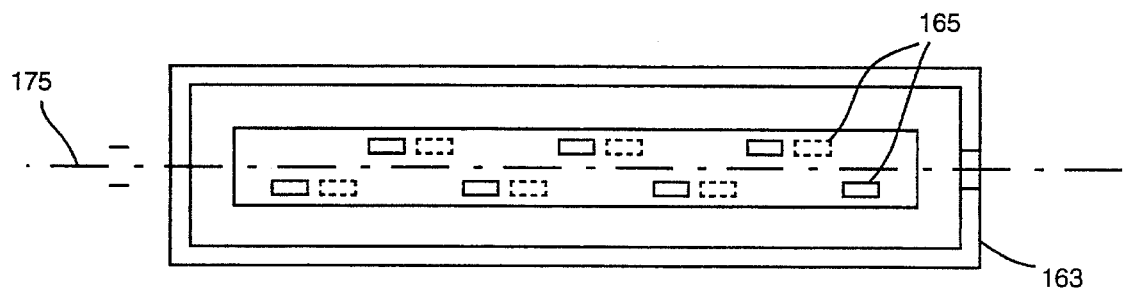
FIG. 7b is a top view diagram of the RF cavity showing a cutout slot geometry.
Figure 7C:
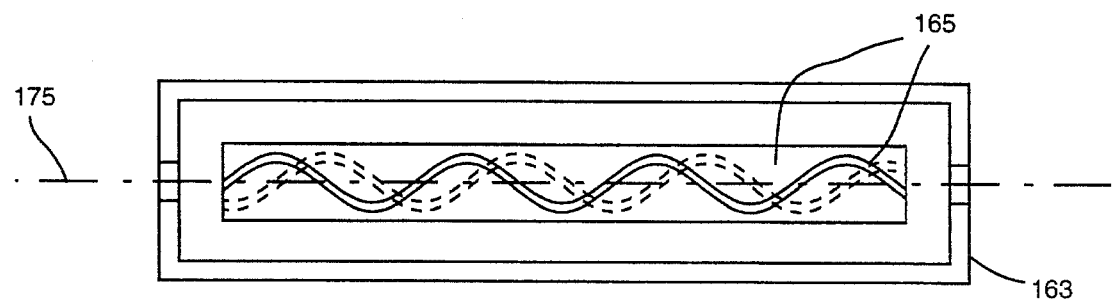
FIG. 7c is a top view diagram of the RF cavity showing a curvilinear slot geometry.

The present invention is not limited to using the transverse slot geometry of FIG. 6. Many other geometries for discontinuities in the surface of the electrodes are useful for the purpose of defeating longitudinal resonance and are to be considered within the scope of the presently disclosed invention. Exemplary alternate discontinuity geometries are shown in FIGS. 7*a, b,* and *c,* corresponding to the top view of the RF cavity 163 as given in FIG. 6*b*. In FIG. 7*a,* the electrodes are shown having slots 165 which are oriented at an angle other than perpendicular to the longitudinal axis 175 of the RF cavity. The individual discontinuities or slots 165 can assume alternative shapes and can assume the form of cutouts as depicted in FIG. 7*b*. In FIG. 7*c,* longitudinally continuous curvilinear (a sinusoidal example is depicted) slots 165 are formed in both the upper and lower electrode surfaces. Fundamental requirements for acceptable geometries are that the discontinuities disrupt any longitudinal current paths that might exist in the electrode surface. If the discontinuity is formed by discrete slots such as in FIGS. 6*b,* 7*a,* and 7*b,* then such slots should appear with sufficiently close longitudinal spacing. In a continuous slot geometry, as depicted in FIG. 7*c,* the longitudinal distance between regions of maximum lateral excursion of the slot (in the case of a sinusoidal curve, this is the period of the sinusoid) should also be sufficiently small. Slots of varying spacing may also be used.

Operation of RF Cavity in Transverse Resonance

Figure 8A:
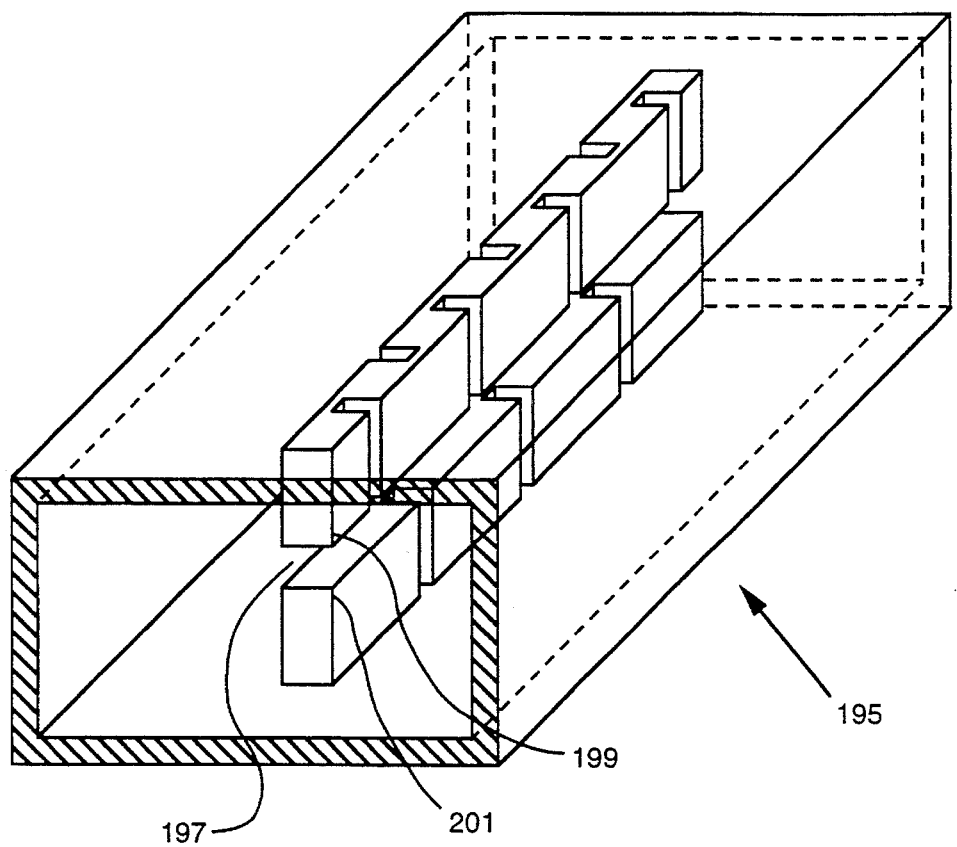
FIG. 8a is a pictorial diagram of a section of an RF cavity which supports a spatially narrow discharge region.
Figure 8B:
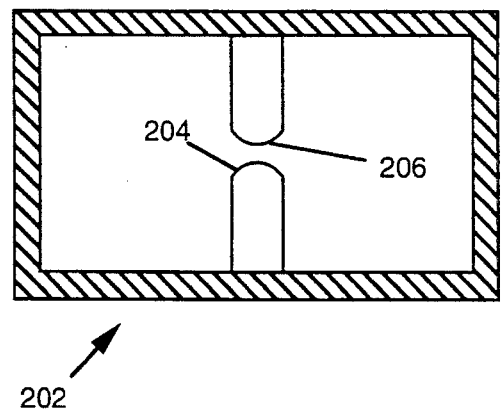
FIG. 8b is a cross sectional view of an RF cavity which has non-planar surfaces bounding the constricted region.

The RF cavity should be excited at frequencies slightly above the transverse resonance cutoff in order to assure that the RF cavity exhibits an impedance which is real-valued and well behaved as a function of frequency. This allows greater ease in matching the impedance of the loaded RF cavity to that of an RF driving source. Variations in the design of the cavity cross section can further exploit the transverse resonant mode of excitation. For example, a constricted region of very narrow lateral width will allow the RF power to be dissipated in a narrow longitudinal filament of gas at the position of field maximum under transverse resonance conditions. FIG. 8*a* depicts such a narrow constricted region RF cavity 195. The constricted region 197 is made laterally narrow by use of narrow upper and lower constricted region surfaces 199 and 201, respectively. In addition, the constricted region surfaces need not be flat as shown in FIG. 1. As shown in the cross-sectional view of an RF cavity 202 in FIG. 8*b,* the constricted region surfaces 204 and 206 may be slightly curved in cases where some modification of the non-longitudinal field distribution within the constricted region is desirable. The curvature may be either convex or concave, depending upon the specific transverse field distribution required.

RF-Excited Laser System and Excitation Means

Figure 9:
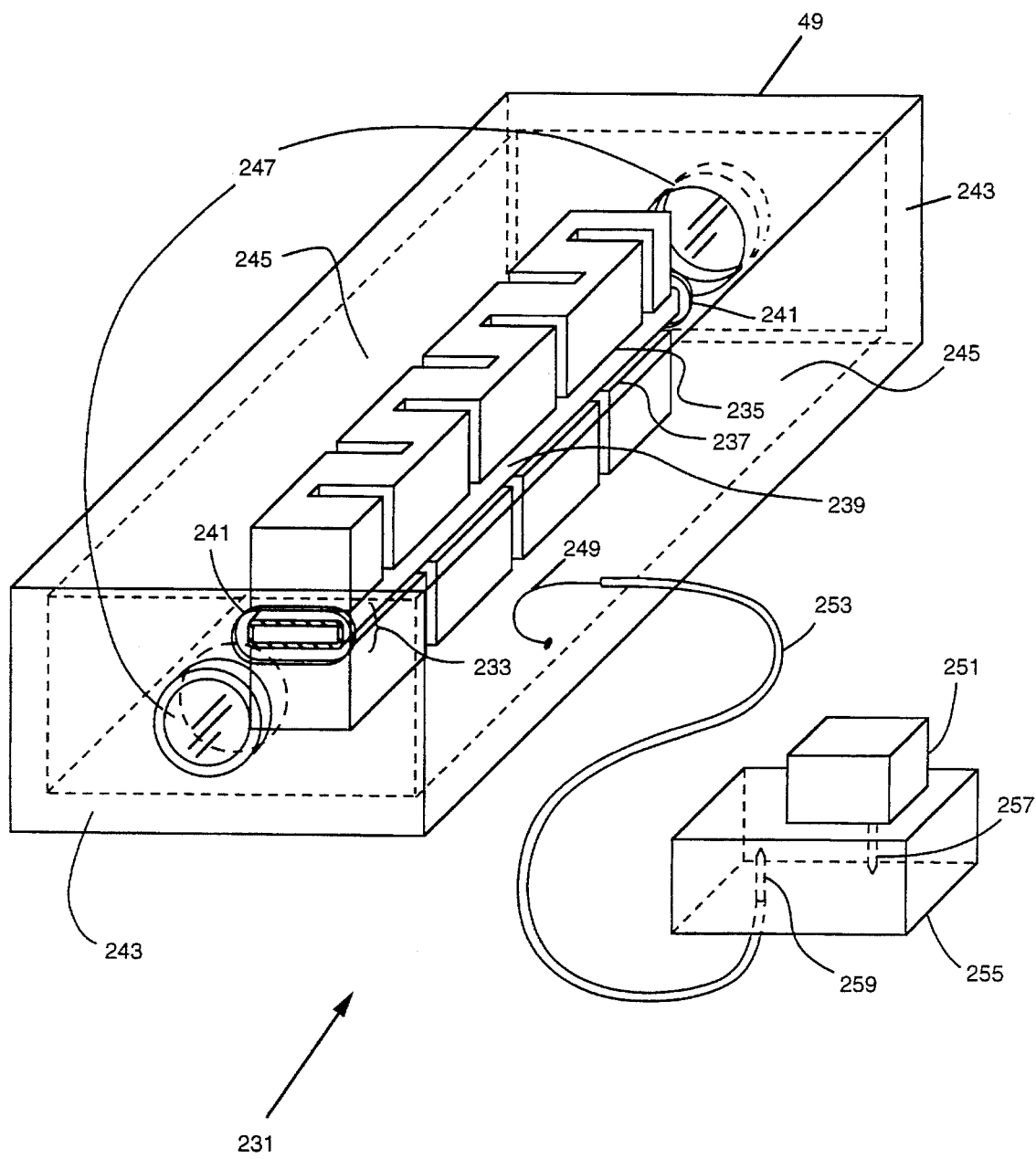
FIG. 9 is a pictorial diagram of the RF-excited gas laser system.

FIG. 9 is a pictorial diagram of a preferred embodiment of the laser system 231. An RF discharge in constricted region 233 is created between slotted upper and lower surfaces 235 and 237 bounding the constricted region 233. The discharge gas is confined within a dielectric tube 239 sealed with integral laser windows 241. The RF cavity module must be terminated on either end by walls 243 which are at least as far from the ends of the discharge region 233 as the side walls 245. This avoids perturbing the fields at the ends of the constricted region 233. These walls hold the laser resonator mirrors 247 in order to form a complete laser oscillator.

Excitation of the microwave RF cavity can be accomplished via capacitive or antenna coupling through one wall of the RF cavity. In FIG. 9, coupling is shown via a magnetic loop 249; other forms of coupling such as iris or probe coupling can be used as well. A magnetron or other microwave power generator 251 is shown providing power to coaxial cable 253 via waveguide structure 255 using input and output probes 257 and 259, respectively. In this way, an RF cavity module containing the laser gas mixture, laser resonator optics, and RF excitation source could be fabricated. Higher power could be obtained from the laser by combining multiple cavity modules.

Figure 10A:
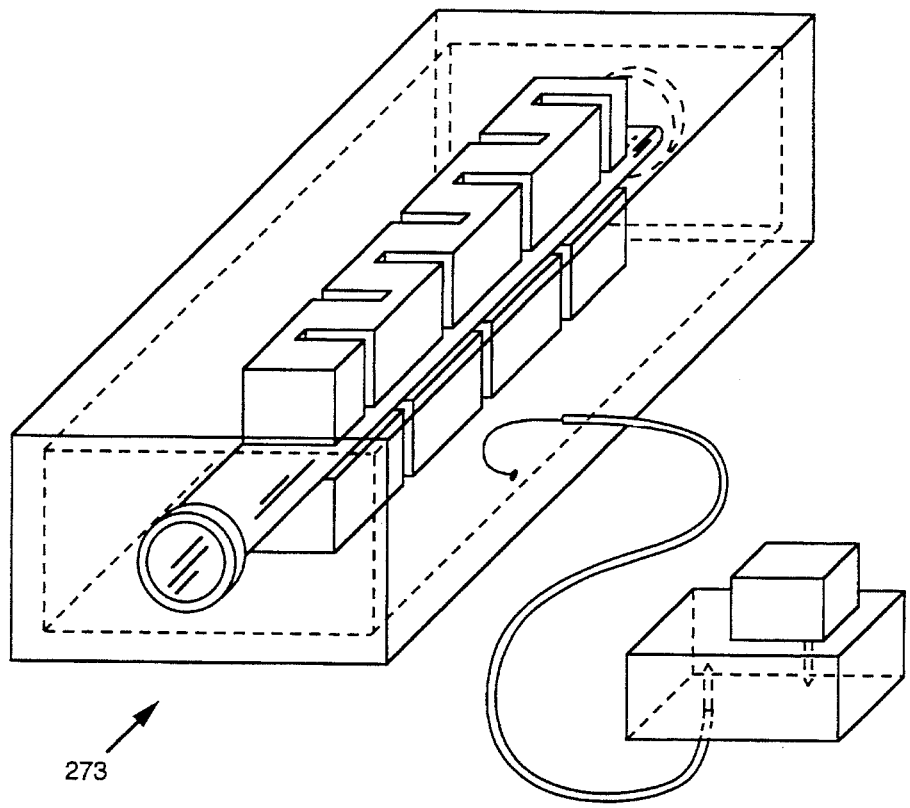
FIG. 10a is a pictorial diagram of the RF-excited gas laser system which incorporates laser mirrors sealed directly to the gas discharge enclosure tube.
Figure 10B:
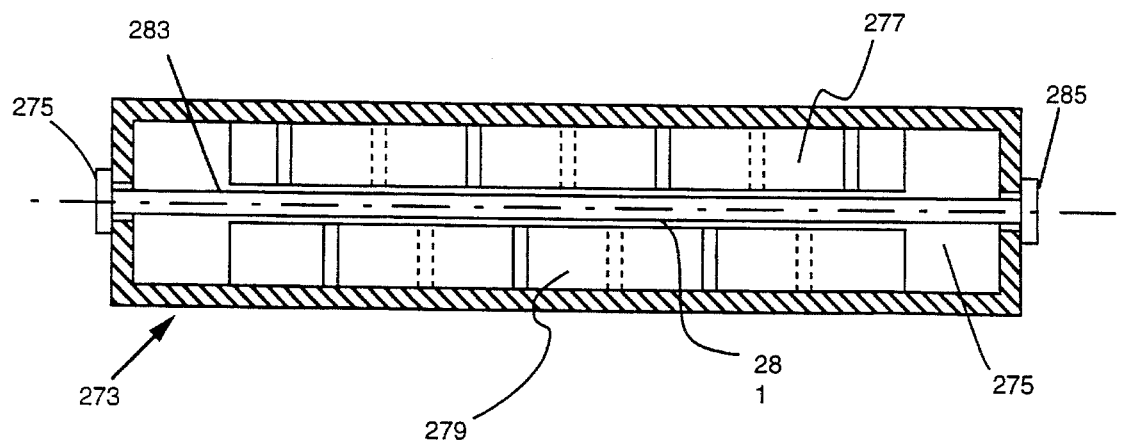

As an alternative, laser mirrors can be sealed directly to the dielectric tube to form the resonator as shown in FIGS. 10*a* and *b*. FIG. 10*a* is a pictorial diagram of this version of the laser resonator 273. The corresponding cross-sectional side view of laser resonator 273 is provided in FIG. 10*b*. In this figure, the dielectric tube 281 extends longitudinally a short distance beyond the constricted region formed by upper and lower electrodes 277 and 279, respectively. The resulting tube regions 283 and 285 are outside the electric field of the constricted region so gas breakdown does not occur in the immediate vicinity of the mirrors 275. Hence the mirrors 275 which are bonded (by means well known in the prior art) to the dielectric tube 281 are protected from the deleterious effects of contact with plasma.

Figure 11:
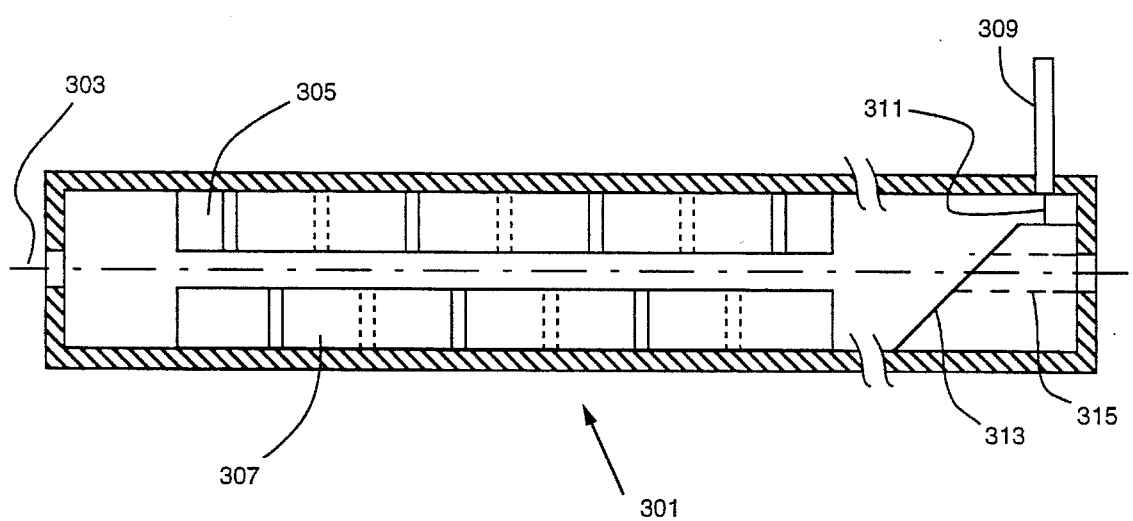
FIG. 11 is a side view cross-sectional diagram of an end pumping geometry for the RF excitation source.

A number of variations on the RF pumping geometry exist. FIG. 11 shows one such alternative which is an end pumping scheme. The figure is a cross-sectional side view of an RF cavity 301 having an optical axis 303 and upper and lower slotted electrodes 305 and 307, respectively. RF energy is introduced to the RF cavity 301 by way of cable 309 and injecting probe 311. A microwave waveguide transition 313 is shown which provides an impedance transformation that matches the impedance at the point of energy injection to the impedance of the discharge region of the RF cavity. This allows for maximum efficiency of RF power transfer to the RF cavity. Additionally, an optimum location for the injecting probe 311 can be ascertained by established design practice. Finally, a vacant volumetric region 315 within the waveguide transition 313 is provided along the optical axis 303 for lasing energy to be conducted from the cavity.

Figure 12A:
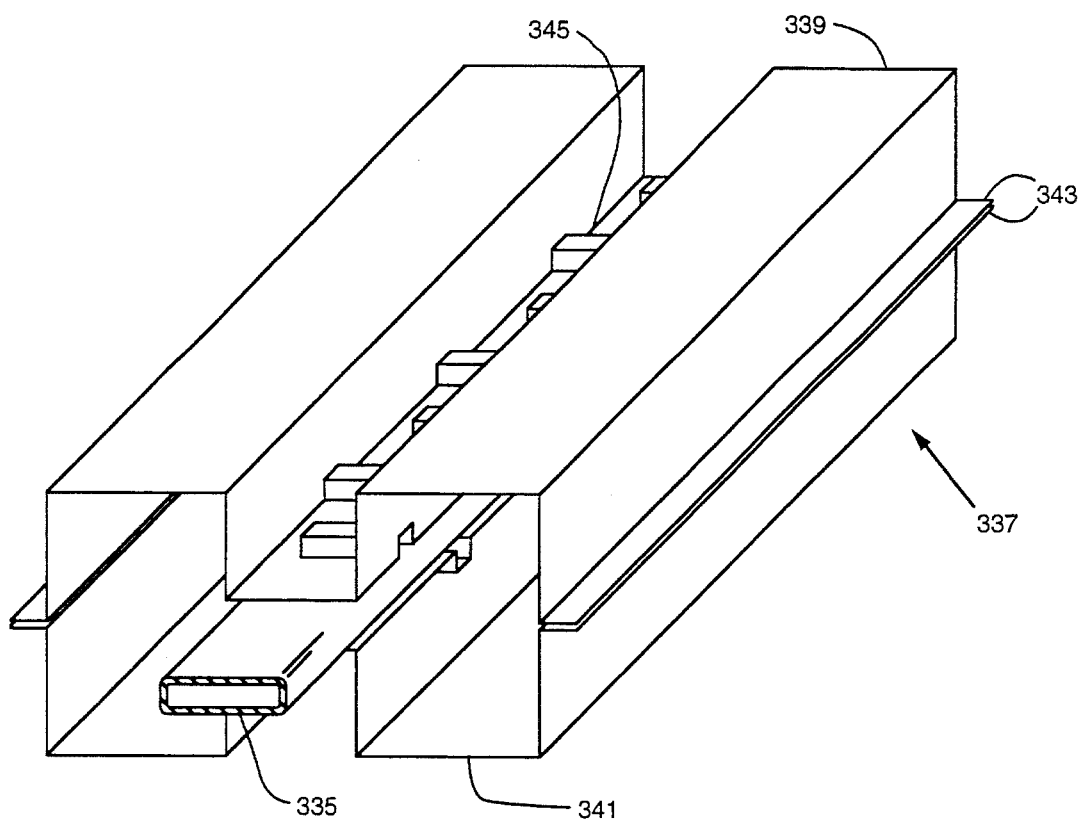
FIG. 12a is a pictorial diagram of an RF cavity made from stamped metal.
Figure 12B:
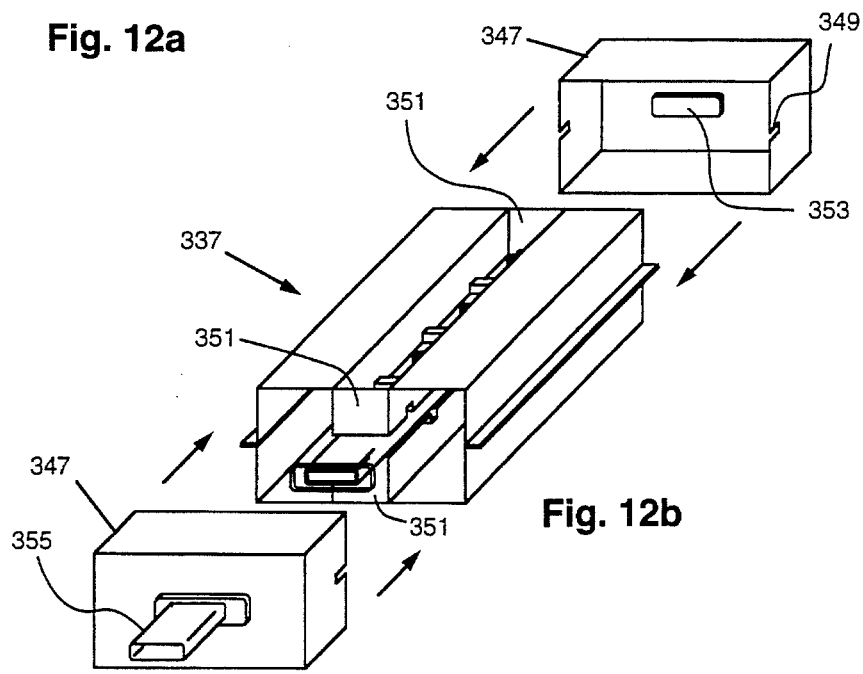

A refinement of the cavity design offering reduced manufacturing cost is shown in FIG. 12a. In this embodiment, the discharge gas is again confined by a dielectric tube 335. Since the RF cavity 337 is not required to confine the gas, it can be formed from stamped metal. Upper and lower halves 339 and 341 of an RF cavity are fastened together at flanges 343 by any number of well known means. The slots in the constricted region surfaces are created by impressions 345 in the cavity halves 339 and 341. FIG. 12b shows end closures 347 which attach to the cavity 337 of FIG. 12a. The RF cavity 337 is shown modified to include plates 351 which together with the "H"-shaped cavity cross section form a rectangular perimeter for each end of RF cavity 337. The cavity ends can then be closed off using end closures 347. End closure slots 349 accommodate flanges 343 and allow the end closures 347 to slide onto each end of RF cavity 337. Additionally, each end closure includes mirror assemblies 353 providing closure of the optical cavity and waveguide stubs 355 which attenuate any RF energy radiated through the mirror apertures.

Figure 13:
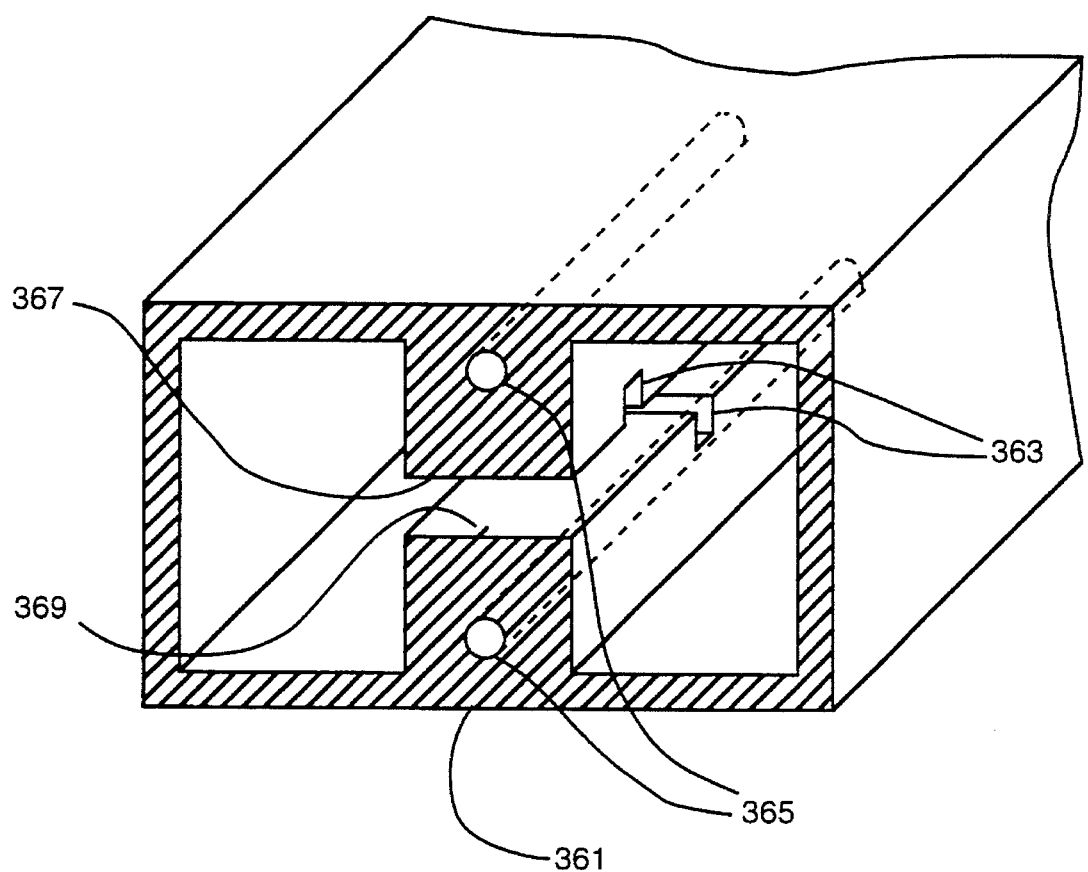
FIG. 13 is a pictorial diagram of a section of RF cavity depicting the incorporation of cooling channels.

FIG. 13 depicts cooling passages in the body of the RF cavity 361. The slots 363 in the surfaces bounding the constricted region are made wider and shallower to accommodate the cooling passages 365 formed in the RF cavity walls above and below the upper and lower surfaces 367 and 369 bounding the constricted region, respectively. For the case of an RF cavity constructed as in FIG. 12b, an alternative approach is simply to provide force air cooling through the interior region of the RF cavity.

Providing a Means of Tuning the RF Cavity Resonant Frequency

Figure 14A:
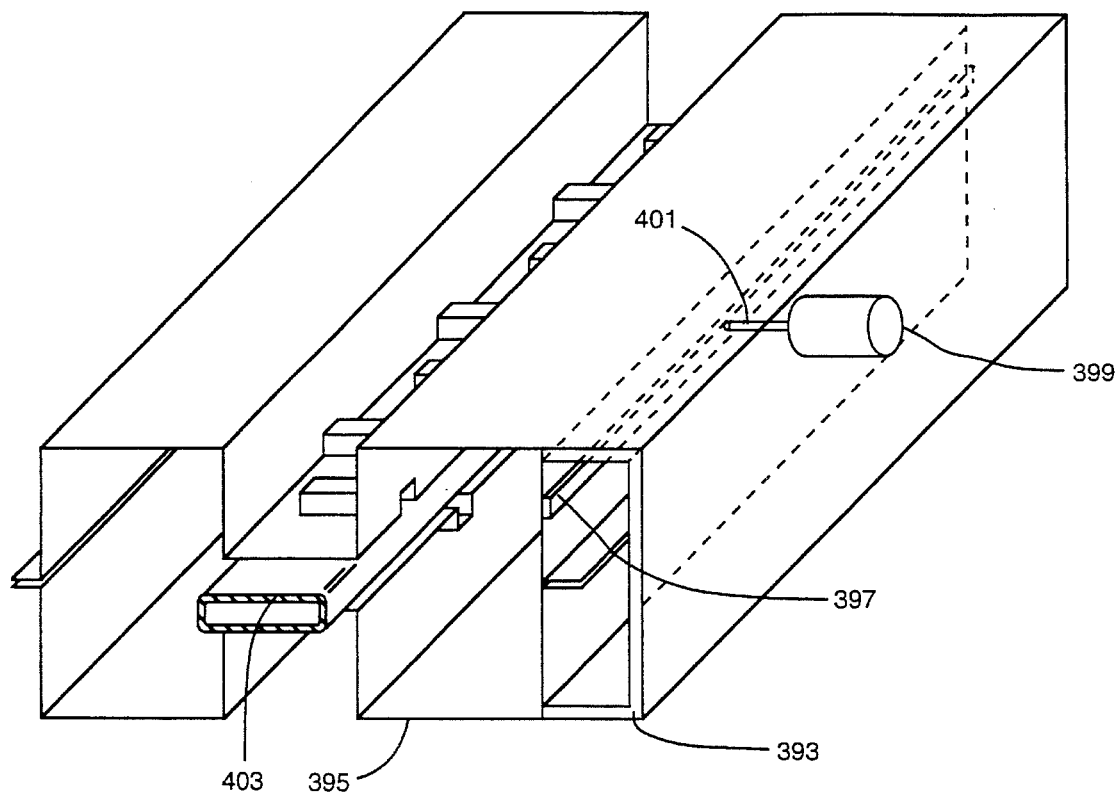
FIG. 14a is a pictorial diagram depicting means for tuning an RF cavity.
Figure 14B:
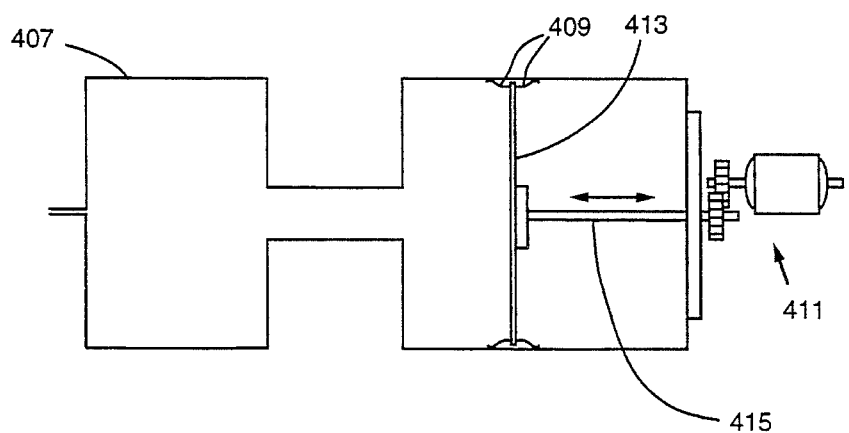
FIG. 14b is a cross sectional diagram depicting an RF cavity tuned by means of cavity wall translation.

Since the cross-sectional shape of the laser enclosure, as shown in FIG. 1, forms a high-Q, resonant, RF or microwave cavity, it must be matched to the operating frequency of the excitation source. When this is accomplished, an electric field maximum will exist in the center of the constricted region for the lowest order transverse cavity mode. The electric field at the two side walls of the cavity will vanish, as previously described. One means of actively tuning the RF cavity is by moving or distorting the shape of its outer wall(s). This slightly changes the cavity interior dimensions and results in a shift in transverse resonant frequency. FIG. 14a is a non-gas tight RF cavity shown without end closures for the purpose of clarity. It contains a dielectric gas enclosure 403 with the outer wall(s) of the RF cavity made substantially thinner than elsewhere, effectively providing thin flexure membranes space periodically along the length of the laser. Deflection can be provided by means of externally mounted screws or actuators. This is exemplified in FIG. 14a, where a "U"-shaped, thick walled structure 393 is attached to the right side of a stamped metal RF cavity 395 (the same RF cavity as in FIG. 12). A metal stiffener 397 runs the length of the upper right wall of the RF cavity. A rotary actuator 399 applies a deformation force to the stiffener 137 by causing advancement of lead screw 401. The stiffener 397 distributes the applied force longitudinally along the upper right wall of the RF cavity causing an inward bowing of this surface and an attending shift in transverse resonant frequency of the RF cavity. Alternatively, one or more of the wall(s) of the RF cavity could be made translatable with respect to the balance of the overall assembly as shown in FIG. 14b. One wall 413 of RF cavity 407 is made translatable and maintains electrical contact with the balance of the cavity via conducting spring finger stock 409. The wall 413 is driven by a lead screw assembly 415 which is shown powered by a motorized gear assembly 411. By means as shown in these figures, an adjustable microwave RF cavity can be tuned to adapt to high power/low cost excitation sources, such as magnetrons, which are likely to have a fixed operating frequency (or, at the most, a very limited tuning range).

Figure 15A:
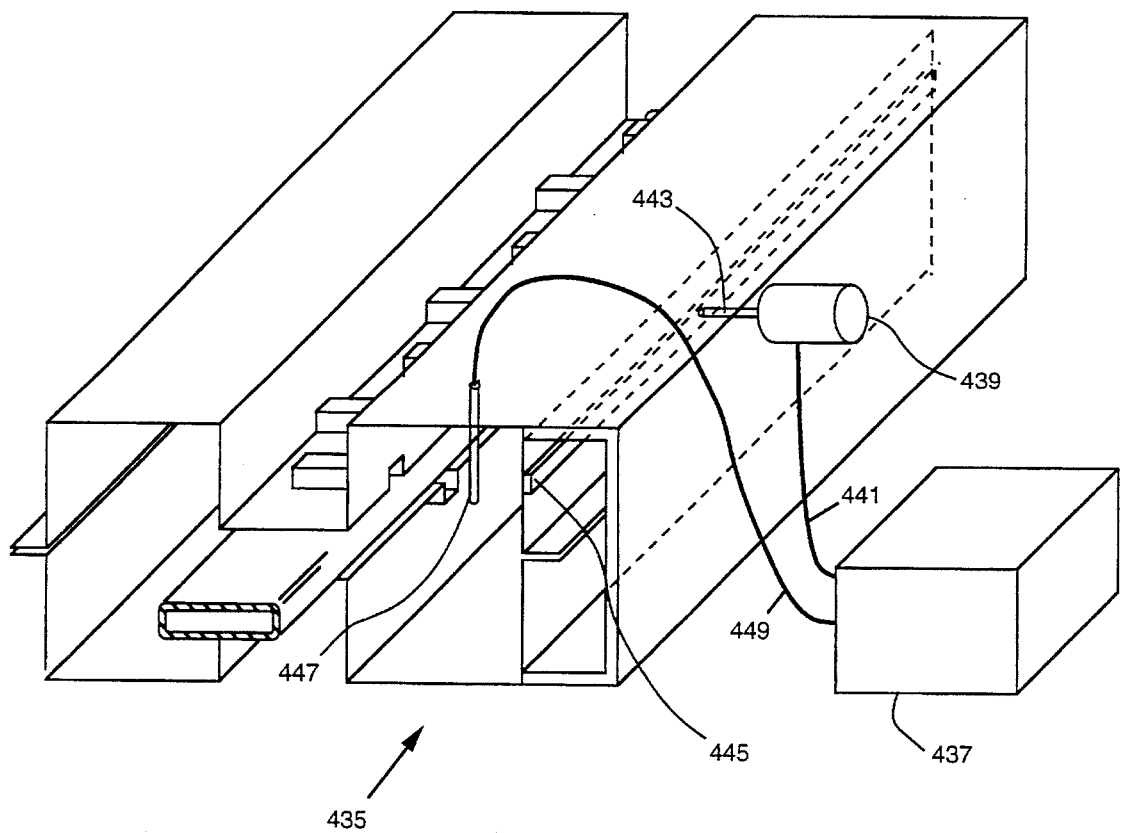
FIG. 15a is a pictorial diagram of a system for closed-loop tuning of an RF cavity for constant power.
Figure 15B:
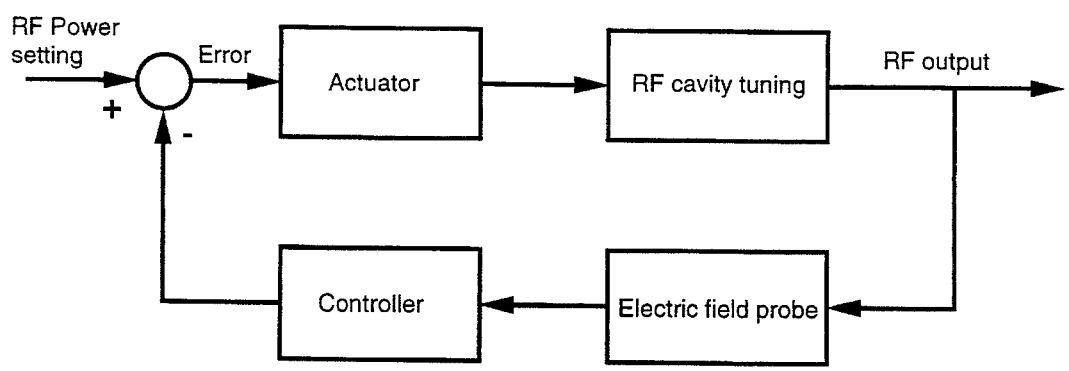
FIG. 15b is a control block diagram containing the functional blocks for closed-loop tuning of an RF cavity.

Temperature variation is significant among the influences tending to cause detuning of the cavity transverse resonant frequency. Such detuning leads to a loss of excitation efficiency and output optical power from the laser. FIG. 15a shows the RF cavity of FIG. 14b adapted to allow closed-loop control of the RF cavity tuning for the purpose of maintaining constant RF power deposition in the discharge gas. The control unit 437 provides a drive signal to actuator 439 via electrical and/or fiber optic connection 441. The actuator 439 advances lead screw 443 to deform the cavity 435 by flexing of stiffener 445. The resulting alteration of the RF cavity resonance will change the cavity electric field intensity which is sensed by probe 447. The power indicating-signal from probe 447 is provided by connection 449 to control unit 437 which compares the measured electric field strength with a preset value in order to generate further correction signals to the actuator 439. The control block diagram for this system is provided in FIG. 15b.

Interconnecting RF Cavity Modules

Figure 16A:
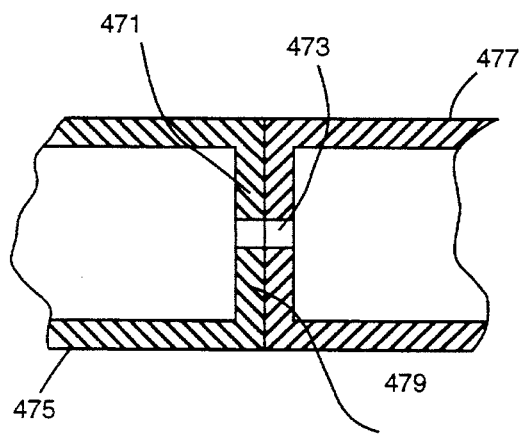
FIG. 16a is a cross-sectional diagram of aperture coupling means of laser energy transfer between RF modules.
Figure 16B:
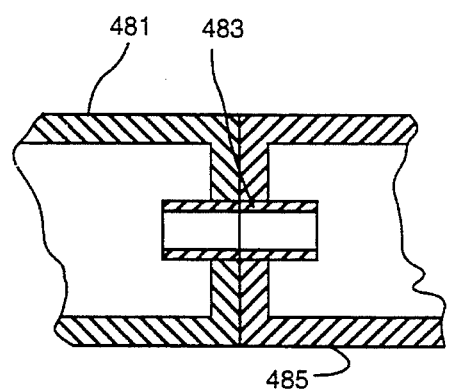
FIG. 16b is a cross-sectional diagram of a waveguide beyond cutoff used for the transfer of laser energy between RF modules.
Figure 16C:
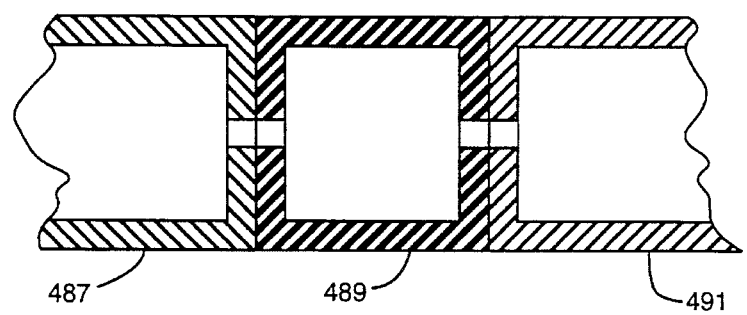
FIG. 16c is a cross-sectional diagram of a microwave choke as means of laser energy transfer between RF modules.

In the case of a single RF cavity laser as in FIG. 9, the RF cavity end walls must contain apertures whose dimensions would be consistent with transmitting laser radiation while, at the same time, containing the microwave RF energy. This is also a requirement in the implementation of a modular capability, where the RF cavity pump modules are to be interconnected end-to-end in a serial fashion. This would prevent RF interaction between adjacent RF cavities. Some appropriate RF cavity interconnection techniques are shown in FIG. 16. The connection methods shown are aperture coupling, waveguide beyond cutoff, and microwave choke coupling. Aperture coupling, shown in FIG. 16a, consists of placing an aperture 473 just large enough to pass the laser beam through the walls 471 and 479 of two adjacent microwave cavity modules, 475 and 477. The aperture coupling method requires that the greatest aperture dimension should be substantially smaller than a half wavelength at the microwave frequency. The waveguide beyond cutoff method shown in FIG. 16b, uses a section of waveguide 483 with a cross section just large enough to pass the laser beam unobstructed between microwave cavity modules 481 and 485. The waveguide RF dimensions must be such that it is beyond cutoff at the microwave operating frequency of the cavity module. The microwave choke coupling technique, shown in FIG. 16c, consists of connecting the two microwave laser cavities 487 and 491 via an intermediate cavity 489, tuned to produce minimum coupling between the two microwave cavities 487 and 491. A microwave absorbing material can also be used in the intermediate cavity 489 to further enhance the decoupling, as long as the material does not block or attenuate laser radiation.

Formation of a Laser Source from Interconnected Cavity Modules

Figure 17A:
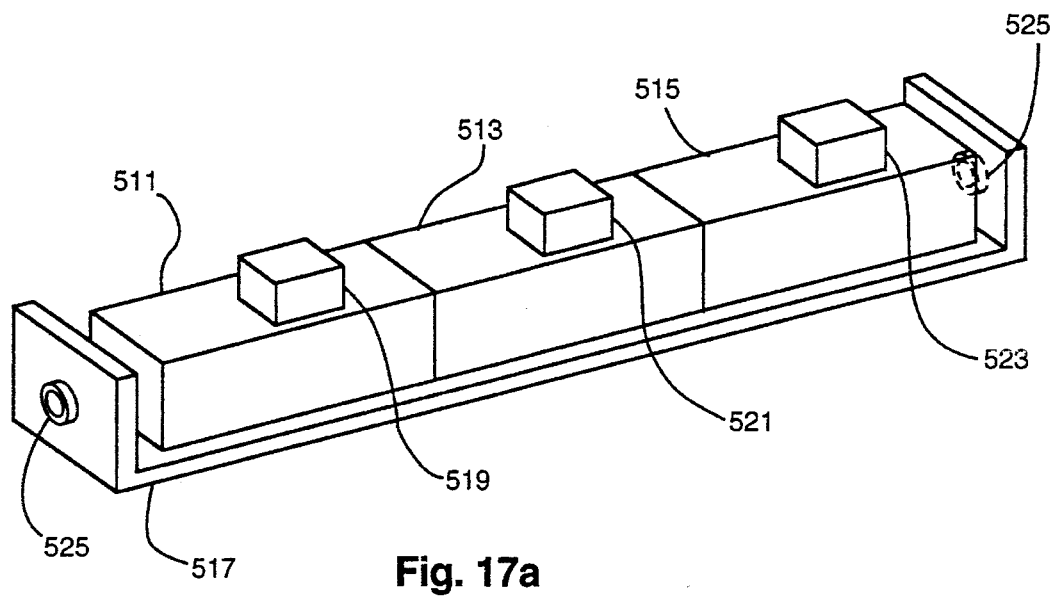
FIG. 17a is a pictorial diagram of laser system comprising a multiplicity of RF modules placed in tandem within a supporting structure which forms the optical cavity.
Figure 17B:
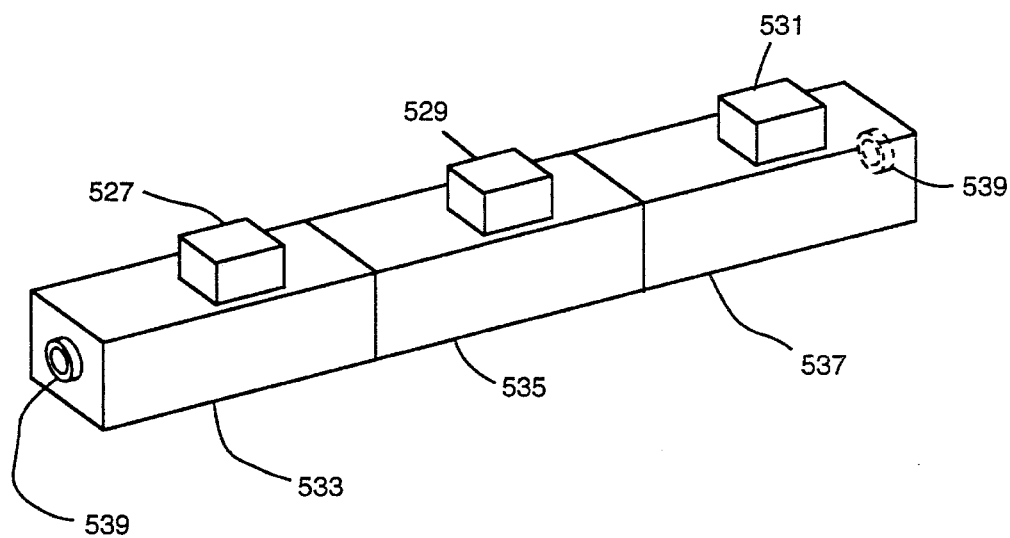
FIG. 17b is a pictorial diagram of a laser system comprising a multiplicity of RF modules connected together directly without a supporting structure.
Figure 18:
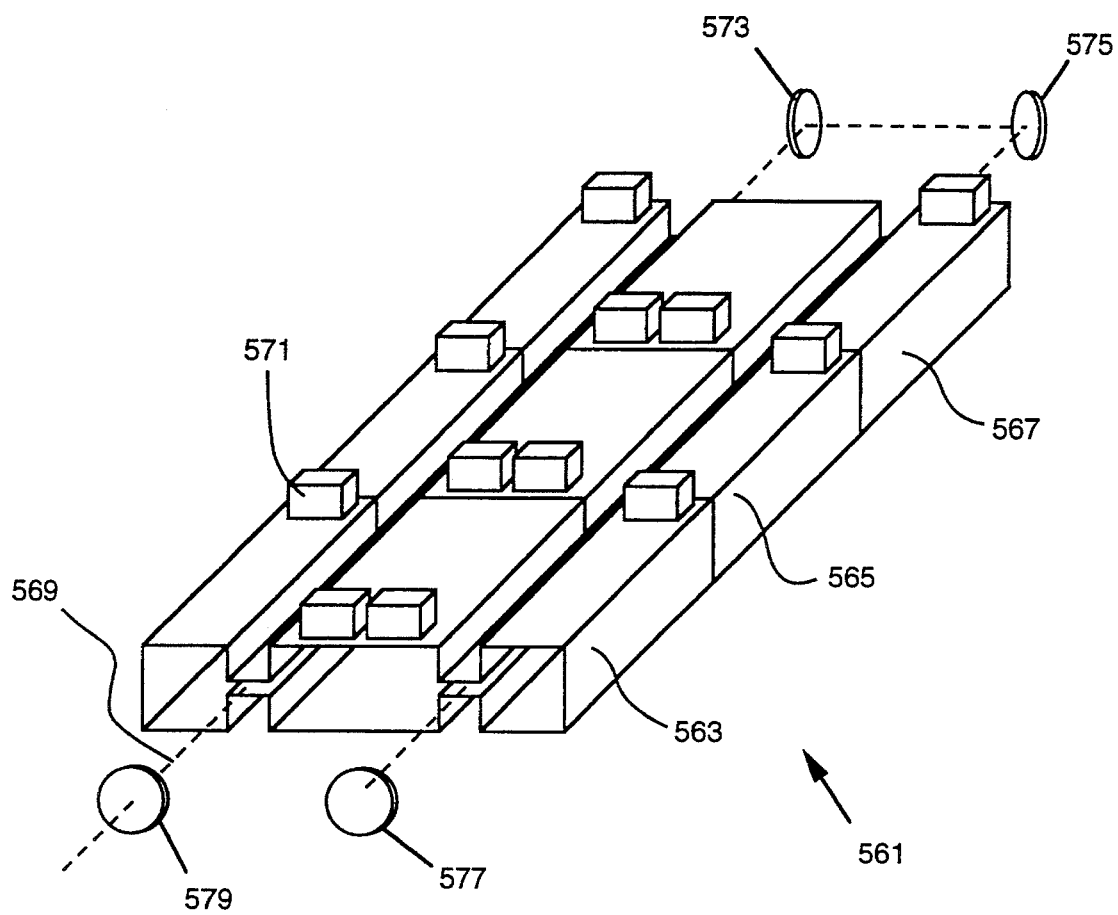
FIG. 18 is a pictorial diagram of a laser system comprising a multiplicity of RF modules, having multiple constricted regions, connected together directly without a supporting structure.

This concept involves the use of multiple, isolated RF cavities (each driven by its own RF power source) connected in series. Multiple cavities combined in this way could form the basis of a powerful laser source when the combination is fitted with an appropriate laser resonator as shown in FIG. 17a. In the example shown, three RF cavity modules 511, 513, and 515, each having associated microwave power sources 519, 521, and 523 are combined within a supporting optical resonator structure 517 fitted with laser mirror mounts 525. This forms a laser oscillator. Use of a larger support structure would allow additional modules to be combined in series to produce higher laser power outputs than that produced by the configuration shown. An alternative configuration is that of FIG. 17*b*. Each of the three RF cavity modules 533, 535, and 537, again have their own microwave power sources 527, 529, and 531. Additionally each RF cavity module has provision for installation of intercavity optical coupling at its longitudinal ends, as discussed relative to FIG. 16 or mirror mounts. FIG. 17*b* depicts a configuration in which the central RF cavity module 535 has optical coupling means installed at both of its ends, and where RF cavity modules 533 and 537 each have installed at one end optical coupling means and at the other end a mirror mount 539. A more elaborate situation is that shown in FIG. 18. This figure depicts a modular RF-excited laser 561 shown absent end closures for purposes of clarity. The individual RF cavities 563, 565, and 567 have cross sections as depicted in FIG. 2*b* with multiple RF power sources 571 coupled into the expanded regions of each cavity. A folded optical path 569 which employs totally reflecting mirrors 573, 575, 577, and partially reflecting mirror 579 is shown which utilizes the gain volume of the entire geometry.

What is claimed is:

1. An RF-excited laser system comprising:
   (a) a longitudinal RF cavity having a cross section perpendicular to the longitudinal axis of said RF cavity which has at least one constricted region which extends along the length of said RF cavity, each said constricted region serving to concentrate transverse electric field lines within each said constricted region for the purpose of supporting a plasma discharge in each said constricted region;
   (b) reflective means for defining an optical cavity, said optical cavity at least partially occupying the interior of said RF cavity;
   (c) a gain medium disposed within said optical cavity; and
   (d) an RF pumping means for applying power to said RF cavity, said longitudinal cavity having an associated longitudinal resonance and at least one transverse resonance, each said transverse resonance having an associated transverse resonant frequency, said RF pumping means providing RF power to said RF cavity, said RF power exciting at least one said transverse resonance thereby maximizing the concentration of said transverse electric field lines within each said constricted region, the opposing surfaces bounding each said constricted region further comprising upper and lower opposing surfaces which have discontinuities along the length of each said constricted region so as to suppress said longitudinal resonance of said RF cavity at its drive frequency, thereby providing uniform RF excitation along the entire length of each said constricted or discharge region.

2. An RF-excited laser system as recited in claim 1 wherein said discontinuities comprise a set of curvilinear slots, each said slot cut along the length of each said opposing surface bounding each said constricted region.

3. An RF-excited laser system as recited in claim 2 wherein said discontinuities are spaced periodically along the length of each said constricted region.

4. An RF-excited laser system as recited in claim 3 wherein said discontinuities comprise slots cut at an angle to the longitudinal axis of said RF cavity partially across said upper and lower opposing surfaces which bound each said constricted region, said slots made by initiating a plurality of cuts in both said upper and lower surfaces bounding each said constricted region commencing from one side of each said constricted region partially across each said constricted region, the side from which said cuts commence alternating between the right side and the left side of each said constricted region at the location of every RF current maximum along the longitudinal axis of said RF cavity, the plurality of said slots in said upper surface bounding each said constricted region displaced to occur at positions which are longitudinally between the plurality of said slots in said lower surface bounding each said constricted region, the slotted upper and lower surfaces bounding each said constricted region thereby forming meandering, but continuous surface paths as a function of longitudinal displacement along said RF cavity, said displacement between the set of slots in said upper surface and the set of slots in said lower surface reducing variation in the electric field along the longitudinal axis of said RF cavity while not substantially affecting the electric field in the direction which is perpendicular to both said longitudinal axis of said RF cavity and the direction of the transverse electric field confined within each said constricted region.

5. An RF-excited laser system as recited in claim 1 wherein said gain medium is contained within at least one gas enclosure within each said constricted region, said gas enclosure made of a low loss, dielectric material and having integral laser mirrors attached thereto.

6. An RF-excited laser system as recited in claim 5 wherein the shape of said RF cavity is capable of perturbation so as to shift said transverse resonant frequencies of said RF cavity.

7. An RF-excited laser system as recited in claim 1 wherein said RF pumping means comprises at least one magnetron.

8. An RF-excited laser system comprising:
   (a) a longitudinal RF cavity having a cross section perpendicular to the longitudinal axis of said RF cavity which has multiple expanded regions laterally connected via multiple constricted regions, each said constricted region serving to concentrate transverse electric field lines within each said constricted region for the purpose of supporting a plasma discharge in each said constricted region;
   (b) reflective means for defining an optical cavity, said optical cavity at least partially occupying the interior of said RF cavity;
   (c) a gain medium disposed within said optical cavity; and
   (d) an RF pumping means for applying power to said RF cavity, said longitudinal cavity having an associated longitudinal resonance and at lest one transverse resonance, each said transverse resonance having an associated transverse resonant frequency, said RF pumping means providing RF power to said RF cavity, said RF power exciting at least one said transverse resonance thereby maximizing the concentration of said transverse electric field lines within each said constricted region.

9. An RF-excited laser system as recited in claim 8 wherein said RF pumping means further comprises a plurality of individual RF power sources, each said individual RF power source coupling power into a corresponding said expanded region.

10. An RF-excited laser system comprising:
    (a) a longitudinal RF cavity having a cross section perpendicular to the longitudinal axis of said RF cavity which has at least one constricted region which extends along the length of said RF cavity, each said constricted region serving to concentrate transverse electric field lines within each said constricted region for the purpose of supporting a plasma discharge in each said constricted region;

(b) reflective means for defining an optical cavity, said optical cavity at least partially occupying the interior of said RF cavity;

(c) a gain medium disposed within said optical cavity; and (d) an RF pumping means for applying power to said RF cavity, said longitudinal cavity having an associated longitudinal resonance and at least one transverse resonance, each said transverse resonance having an associated transverse resonant frequency, said RF pumping means providing RF power to said RF cavity, said RF power exciting at least one said transverse resonance thereby maximizing the concentration of said transverse electric field lines within each said constricted region, said RF cavity having defined walls and the shape of said RF cavity capable of perturbation so as to shift said transverse resonant frequencies of said RF cavity.

11. An RF-excited laser system as recited in claim 10 wherein said perturbation of shape of said RF cavity is achieved by translation of at least one said wall of said RF cavity, electrical contact maintained with translatable walls via conducting spring fingerstock.

12. An RF-excited laser system as recited in claim 10 wherein said walls of said RF cavity are flexible and can be deflected by actuation means for the purpose of tuning said transverse resonant frequencies of said RF cavity.

13. An RF-excited laser system as recited in claim 12 wherein said laser system includes electrically controllable actuation means for tuning said transverse resonant frequencies of said RF cavity, an electric field sensor disposed within said RF cavity, and control means receiving field strength measurements from said electric field sensor and transmitting to said actuation means a control signal for tuning of said RF cavity, the combination of said actuation means, electric field sensor, and control means providing closed-loop feedback control of cavity tuning to maintain relatively constant RF excitation of said RF cavity despite the influence of thermal variations, vibration, and motion of said RF cavity which tend to detune said RF cavity.

14. An RF-excited laser system comprising:

(a) a longitudinal RF cavity having an associated longitudinal resonance supporting a discharge region between opposing surfaces of electrodes contained within said RF cavity, said electrode surfaces having discontinuities along the length of said discharge region so as to suppress said longitudinal resonance of said RF cavity at its drive frequency, thereby providing uniform RF excitation along the entire length of said discharge region;

(b) reflective means for defining an optical cavity, said optical cavity at least partially occupying the interior of said RF cavity;

(c) a gain medium disposed within said optical cavity; and (d) an RF pumping means for applying power to said RF cavity.

15. An RF-excited laser system as recited in claim 14 wherein said gain medium is contained within at least one gas enclosure positioned between said opposing electrode surfaces, said gas enclosure made of a low loss, dielectric material and having integral laser mirrors attached thereto.

16. An RF-excited laser system as recited in claim 15 wherein said gain medium is contained within a plurality of said gas enclosures placed parallel to one another between said opposing electrode surfaces.

17. An RF-excited laser system comprising:

(a) RF modules, each comprising a longitudinal RF cavity, said longitudinal RF cavity having a cross section perpendicular to the longitudinal axis of said RF cavity which has at least one constricted region which extends along the length of said RF cavity, said longitudinal cavity having an associated longitudinal resonance and at least one transverse resonance, each said constricted region serving to concentrate transverse electric field lines within each said constricted region for the purpose of supporting a plasma discharge in each said constricted region, a gain medium disposed within at least a portion of said RF cavity, and RF pumping means for applying power to said RF cavity;

(b) a modular assembly comprising a longitudinal mounting platform for support of said RF modules, said modular assembly accommodating a multiplicity of said RF modules interconnected end-to-end in serial fashion;

(c) reflective means for defining a composite optical cavity for said RF-excited laser system, said optical cavity largely encompassing the optical gain volumes of each said RF module when placed end-to-end; and (d) optical coupling means allowing the propagation of light from one said RF module to another such said RF module, and to said reflective means, said optical coupling means prohibiting the transfer of RF energy among said RF modules.

18. An RF-excited laser system as recited in claim 17 wherein the supplied RF energy excites at least one said transverse resonance thereby maximizing the concentration of said transverse electric field lines within each said constricted region, each said constricted region bounded by opposing surfaces of electrodes contained with said RF cavity, each said transverse resonance having an associated transverse resonant frequency.

19. An RF-excited laser system as recited in claim 18 wherein said optical coupling means comprises aperture coupling.

20. An RF-excited laser system as recited in claim 18 wherein said optical coupling means comprises a waveguide beyond cutoff.

21. An RF-excited laser system as recited in claim 18 wherein said optical coupling means comprises a microwave choke.

22. An RF-excited laser system as recited in claim 18 wherein said cross section is the shape of a letter "H" foreshortened in height, the horizontal constricted region of the "H"-shaped cross section comprising said constricted region which concentrates said RF energy.

23. An RF-excited laser system as recited in claim 18 wherein said cavity cross section comprises multiple expanded regions laterally connected via multiple said constricted regions.

24. An RF-excited laser system as recited in claim 18 wherein said RF cavity has defined walls and the shape of said RF cavity can be perturbed so as to shift said transverse resonant frequencies of said RF cavity.

25. An RF-excited laser system as recited in claim 24 wherein said perturbation of shape of said RF cavity is achieved by translation of at least one said wall of said RF cavity, electrical contact maintained with translatable walls via conducting spring fingerstock.

26. An RF-excited laser system as recited in claim 24 wherein said walls of said RF cavity are flexible and capable of deflection by actuation means for the purpose of tuning said RF cavity.

27. An RF-excited laser system as recited in claim 26 wherein said laser system includes electrically controllable actuation means for tuning said transverse resonant frequencies of said RF cavity, an electric field sensor disposed within said RF cavity, and control means receiving field strength measurements from said electric field sensor and transmitting to said actuation means a control signal for tuning of said cavity, the combination of said actuation means, electric field sensor, and control means providing closed-loop feedback control of cavity tuning to maintain relatively constant RF excitation of said RF cavity despite the influence of thermal variations, vibration, and motion of said RF cavity which tend to detune said RF cavity.

28. An RF-excited laser system as recited in claim 18 wherein said gain medium is contained within at least one gas enclosure within each said constricted region, said gas enclosure made of a low loss, dielectric material and having integral laser windows attached thereto.

29. An RF-excited laser system as recited in claim 28 wherein the shape of said RF cavity can be perturbed so as to shift said transverse resonant frequencies of said RF cavity.

30. An RF-excited laser system as recited in claim 18 wherein said opposing surfaces bounding each said constricted region further comprise upper and lower opposing surfaces which have discontinuities along the length of each said constricted region so as to suppress said longitudinal resonance of said RF cavity at its drive frequency, thereby providing uniform RF excitation along the entire length of each said constricted or discharge region.

31. An RF-excited laser system as recited in claim 30 wherein said discontinuities comprise a set of curvilinear slots, each said slot cut along the length of each said opposing surface bounding each said constricted region.

32. An RF-excited laser system as recited in claim 30 wherein said discontinuities are spaced periodically along the length of each said constricted region.

33. An RF-excited laser system as recited in claim 32 wherein said discontinuities comprise slots cut at an angle to said longitudinal axis of said RF cavity partially across said upper and lower opposing surfaces which bound each said constricted region, said slots made by initiating cuts in both said upper and lower surfaces bounding each said constricted region commencing from one side of each said constricted region partially across each said constricted region, the side from which said cuts commence alternating between the right side and the left side of each said constricted region at the location of current maxima along the longitudinal axis of said RF cavity, the plurality of said slots in said upper surface bounding each said constricted region displaced to occur at positions which are longitudinally between the set of said slots in said lower surface bounding each said constricted region, the slotted upper and lower surfaces bounding each said constricted region thereby forming meandering, but continuous surface paths as a function of longitudinal displacement along said RF cavity.

34. An RF-excited laser system as recited in claim 30 wherein said gain medium is contained within at east one gas enclosure within said constricted region, said gas enclosure made of a lower loss, dielectric material and having integral laser windows attached thereto.

35. An RF-excited laser system as recited in claim 34 wherein the shape of said RF cavity is capable of perturbation so as to shift said transverse resonant frequencies of said RF cavity.

36. An RF-excited laser system comprising:
(a) RF modules, each comprising a longitudinal RF cavity having an associated longitudinal resonance, a gain medium disposed within at least a portion of said RF cavity, and RF pumping means for applying power to said RF cavity, said RF cavity supporting a discharge region between opposing surfaces of electrodes contained within said RF cavity, said electrode surfaces having discontinuities along the length of said discharge region so as to suppress said longitudinal resonance of said RF cavity at its drive frequency, thereby providing uniform RF excitation along the entire length of said discharge region;
(b) a modular assembly comprising a longitudinal mounting platform for support of said RF modules, said modular assembly accommodating a multiplicity of said RF modules interconnected end-to-end in serial fashion;
(c) reflective means for defining a composite optical cavity for said RF-excited laser system, said optical cavity largely encompassing the optical gain volumes of each said RF module when placed end-to-end; and
(d) optical coupling means allowing the propagation of light from one said RF module to another such said RF module, and to said reflective means, said optical coupling means prohibiting the transfer of RF energy among said RF modules.

37. An RF-excited laser system as recited in claim 36 wherein said gain medium is contained within at least one gas enclosure positioned between said opposing electrode surfaces, said gas enclosure made of a low loss, dielectric material and having integral laser mirrors attached thereto.

38. An RF-excited laser system as recited in claim 37 wherein said gain medium is contained within a plurality of said gas enclosures placed parallel to one another between said opposing electrode surfaces.

39. An RF-excited laser system comprising:
(a) RF modules, each comprising a longitudinal RF cavity, a gain medium disposed within at least a portion of said RF cavity, said gain medium contained within at least one gas enclosure positioned between opposing electrode surfaces within said RF cavity, said gas enclosure made of a low loss, dielectric material and having integral laser windows attached thereto and RF pumping means for applying power to said RF cavity, said RF cavity supporting a discharge region between opposing surfaces of electrodes contained within said RF cavity;
(b) a modular assembly comprising a longitudinal mounting platform for support of said RF modules, said modular assembly accommodating a multiplicity of said RF modules interconnected end-to-end in serial fashion;
(c) reflective means for defining a composite optical cavity for said RF-excited laser system, said optical cavity largely encompassing the optical gain volumes of each said RF module when placed end-to-end; and
(d) optical coupling means allowing the propagation of light from one said RF module to another such said RF module, and to said reflective means, said optical coupling means prohibiting the transfer of RF energy among said RF modules.

40. An RF-excited laser system comprising:

(a) a modular assembly comprising a multiplicity of RF modules interconnected end-to-end in serial fashion, each said RF module further comprising a longitudinal RF cavity, a gain medium disposed within at least a portion of said RF cavity, and RF pumping means for applying power to said RF cavity, said longitudinal RF cavity having a cross section perpendicular to the longitudinal axis of said RF cavity which has at least one constricted region which extends along the length of said RF cavity, each said constricted region serving to concentrate transverse electric field lines within each said constricted region from the purpose of supporting a plasma discharge in each said constricted region, said longitudinal cavity having an associated longitudinal resonance and at least one transverse resonance, each said constricted region bounded by opposing surfaces of electrodes contained with said RF cavity, said opposing surfaces of each said constricted region having discontinuities spaced periodically along the length of said each said constricted region so as to suppress said longitudinal resonance of said RF cavity at its lowest order transverse drive frequency, thereby providing uniform RF excitation along the entire length of each said constricted region, said RF modules interconnected so as to exchange optical energy among said RF modules and prohibit the exchange of RF energy among said RF modules;

(b) reflective means for defining a composite optical cavity for said RF-excited laser system, said optical cavity largely encompassing the optical gain volumes of each said RF module when placed end-to-end, said reflective means attached to the ends of said RF modules; and (c) optical coupling means allowing the propagation of light from one said RF module to another such said RF module, and to said reflective means, said optical coupling means prohibiting the transfer of RF energy among said RF modules.

* * * * *